US012687689B2

(12) United States Patent
Fucsek et al.

(10) Patent No.: US 12,687,689 B2
(45) Date of Patent: Jul. 21, 2026

(54) CABINET WITH SLIDING COMPONENT MOUNT

(71) Applicant: CommScope Technologies LLC, Hickory, NC (US)

(72) Inventors: Tomá Fucsek, Topolniky (SK); Sven Schuemann, Ludwigsfelde (DE); Eric Emmanuel Alston, Fuquay-Varina, NC (US); Christopher Paul Gemme, Hickory, NC (US)

(73) Assignee: COMMSCOPE TECHNOLOGIES LLC, Claremont, NC (US)

( * ) Notice: Subject to any disclaimer, the term of this patent is extended or adjusted under 35 U.S.C. 154(b) by 178 days.

(21) Appl. No.: 18/514,673

(22) Filed: Nov. 20, 2023

(65) Prior Publication Data

US 2024/0094494 A1 Mar. 21, 2024

Related U.S. Application Data

(63) Continuation of application No. PCT/US2022/030314, filed on May 20, 2022.

(60) Provisional application No. 63/217,008, filed on Jun. 30, 2021, provisional application No. 63/190,896, filed on May 20, 2021.

(51) Int. Cl.
G02B 6/44 (2006.01)

(52) U.S. Cl.
CPC ......... G02B 6/4452 (2013.01); G02B 6/4455 (2013.01)

(58) Field of Classification Search
CPC ........ G02B 6/4452; H02G 3/08; H04Q 1/023; H04Q 1/025
See application file for complete search history.

(56) References Cited

U.S. PATENT DOCUMENTS

| | | | | |
|---|---|---|---|---|
| 3,818,283 | A * | 6/1974 | Ward | H04Q 1/023 379/326 |
| 3,954,182 | A * | 5/1976 | McEvers | A47G 25/746 211/94.01 |
| 4,948,220 | A * | 8/1990 | Violo | G02B 6/4454 385/55 |
| 5,339,379 | A * | 8/1994 | Kutsch | G02B 6/44528 385/135 |
| 5,828,807 | A * | 10/1998 | Tucker | H04Q 1/116 385/135 |
| 6,654,460 | B1 * | 11/2003 | Rodgers | H04Q 1/09 379/326 |
| 2014/0178025 | A1 * | 6/2014 | Krampotich | G02B 6/4446 385/135 |

(Continued)

FOREIGN PATENT DOCUMENTS

| | | | |
|---|---|---|---|
| EP | 0222691 | A2 * | 10/1986 |
| EP | 2927724 | A1 * | 10/2015 |
| FR | 2743899 | A1 * | 7/1997 |

OTHER PUBLICATIONS

International Search Report and Written Opinion for Application No. PCT/US2022/030314 mailed Sep. 8, 2022.

*Primary Examiner* — Michael Stahl
(74) *Attorney, Agent, or Firm* — Merchant & Gould P.C.

(57) ABSTRACT

One or more active components can be strand mounted within a cabinet that also has passive optical components. Certain types of strand mounts are slidable relative to the cabinet to enhance access to the components. Each component may be independently slidable.

22 Claims, 23 Drawing Sheets

(56)     References Cited

U.S. PATENT DOCUMENTS

| | | | |
|---|---|---|---|
| 2014/0346129 A1 * | 11/2014 | Hall | A47B 45/00 |
| | | | 29/434 |
| 2015/0334868 A1 | 11/2015 | Fricker et al. | |
| 2016/0135323 A1 | 5/2016 | Haroun | |
| 2016/0262283 A1 | 9/2016 | Phillips et al. | |
| 2020/0267853 A1 | 8/2020 | Merrell et al. | |
| 2020/0317147 A1 | 10/2020 | Sainclivier et al. | |

* cited by examiner

CABINET WITH SLIDING COMPONENT MOUNT

CROSS-REFERENCE TO RELATED APPLICATIONS

This application is a Continuation of International Patent Application No. PCT/US2022/030314 filed on May 20, 2022, which claims the benefit of U.S. Patent Application Ser. No. 63/190,896, filed on May 20, 2021 and claims the benefit of U.S. Patent Application Ser. No. 63/217,008, filed on Jun. 30, 2021, the disclosures of which are incorporated herein by reference in their entireties. To the extent appropriate, a claim of priority is made to each of the above disclosed applications.

BACKGROUND

Optical networks enable service providers to deliver high bandwidth communication capabilities to customers. Optical networks can include a central office that provides headend functionality to connects a number of end subscribers (also called end users herein) in a network. The central office can additionally connect to a larger network such as the Internet (not shown), a public switched telephone network (PSTN), and/or a small cell network.

In a traditional passive fiber optic network (PON), cabinets often referred to as fiber distribution hubs (FDHs) are deployed near the outer edge of the network to house and protect passive optical components (e.g., passive optical power splitters) and to provide demateable optical connection locations (e.g., by a termination field including an array of fiber optic adapters) with respect to subscribers in the vicinity of the FDHs. More recently, demand has increased for cabinets that can accommodate both passive and active components. Thus, there is a need for innovative cabinet designs for housing active and passive components in a compact manner while maintaining ease of access for installation, network expansion, network modification, testing, trouble shooting, and maintenance.

SUMMARY

Some aspects of the disclosure are directed to an all-in-one cabinet having both passive optical components and active electrical components. In some examples, the cabinet can support PON (Passive Optical Network), GPON (Gigabit Passive Optical Network), EPON (Ethernet Passive Optical Network), RFoG (Radio Frequency over Glass) and other services. In some example, the cabinet includes a component mounting configuration that allows active components to be mounted in a strand-mounted fashion (e.g., hung beneath a mounting member via one or more strand-mount clamps) within the cabinet and also allows the active components to be easily slid in and out of the cabinet for access. In some access, the cabinet includes both front and rear openings for allowing optical and/or active components to be accessed.

Another aspect of the present disclosure relates to a component mount within the cabinet that allows various components to be mounted in a strand-mount fashion within the cabinet. Such mounting allows components normally mounted outside the cabinet (e.g., strand mounted) to be disposed within the cabinet. The component mount includes a slide mechanism that allows the components to be slid in and out of the cabinet for access.

Further aspects of the present disclosure relate to component mounts are that are slidable relative to the cabinet and that allow components such as OLTs and/or Vhubs to be mounted in the cabinet in a strand-mounted fashion. Accordingly, the component mounts allow the mounted components to be slid at least partially out of the cabinet to facilitate access. In some examples, sliding out the component mount from the cabinet facilitates initially mounting the component to the component mount. In other examples, sliding out the component facilitates future access to the component (e.g., for testing and troubleshooting) without unmounting the component from the component mount. In certain examples, multiple component mounts can be independently slid relative to the cabinet between retracted and extended positions. The ability to readily access the components also facilitates component upgrades.

Another aspect of the present disclosure relates to a cabinet having a first equipment mounting section configured to hold active components and a second equipment mounting section configured to hold passive components. The first equipment mounting section is accessible from an exterior of the cabinet by using a first door and the second equipment mounting section is accessible from an exterior of the cabinet by using a second door. One or more cables (e.g., fibers and/or wires) can extend within the interior of the cabinet between the first and second equipment mounting sections. In certain implementations, the first door faces in a different direction than the second door when the first and second doors are closed. In certain examples, the first and second doors face in transverse directions when both closed. In an example, the first door is disposed at a front of the cabinet and the second door is disposed at a side of the cabinet.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

3

Figure 4:
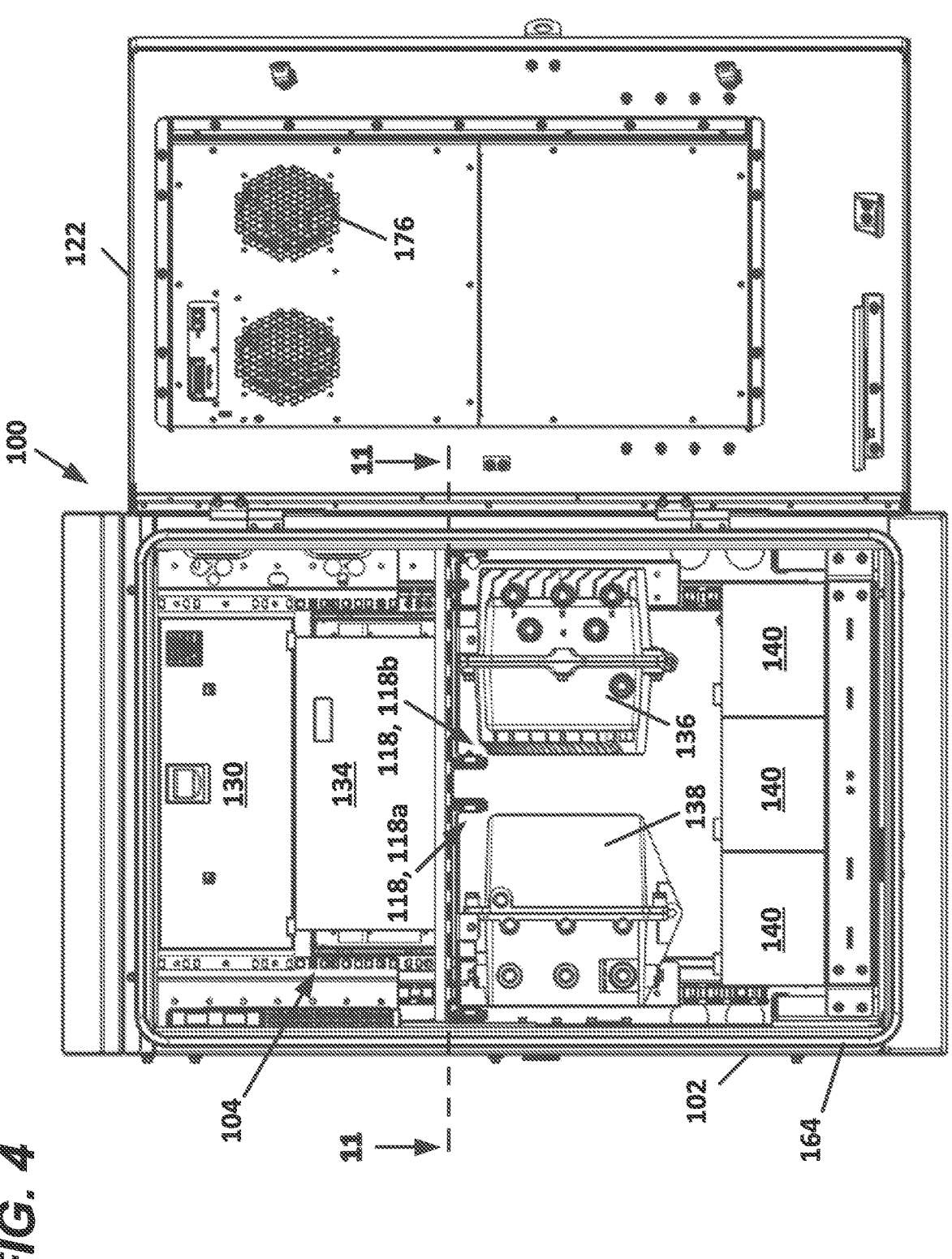
FIG. 4 is a front elevational view of an example implementation of the cabinet of FIG. 1 showing a front door open for ease in viewing the components within the cabinet.
Figure 8:
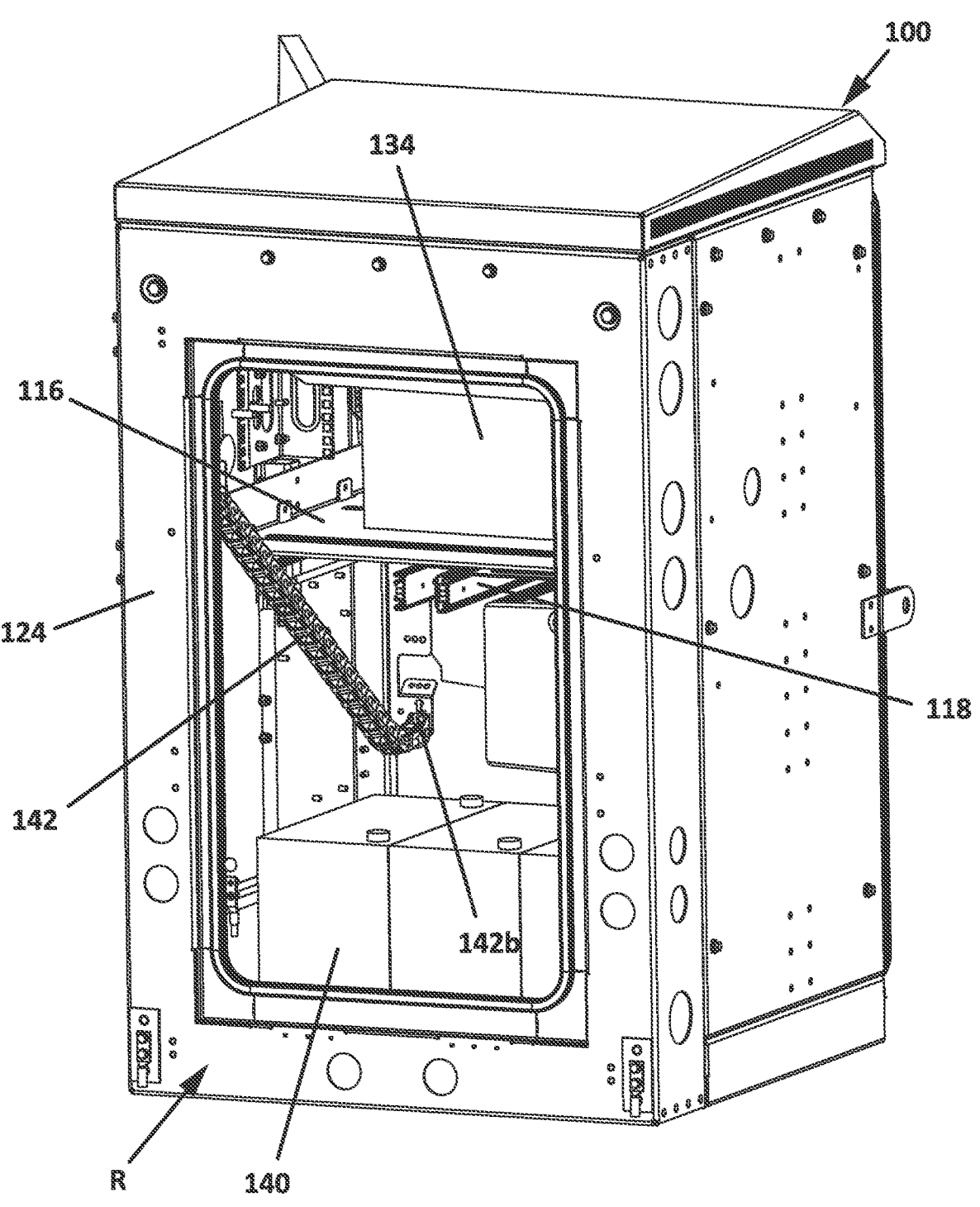
Figure 9:
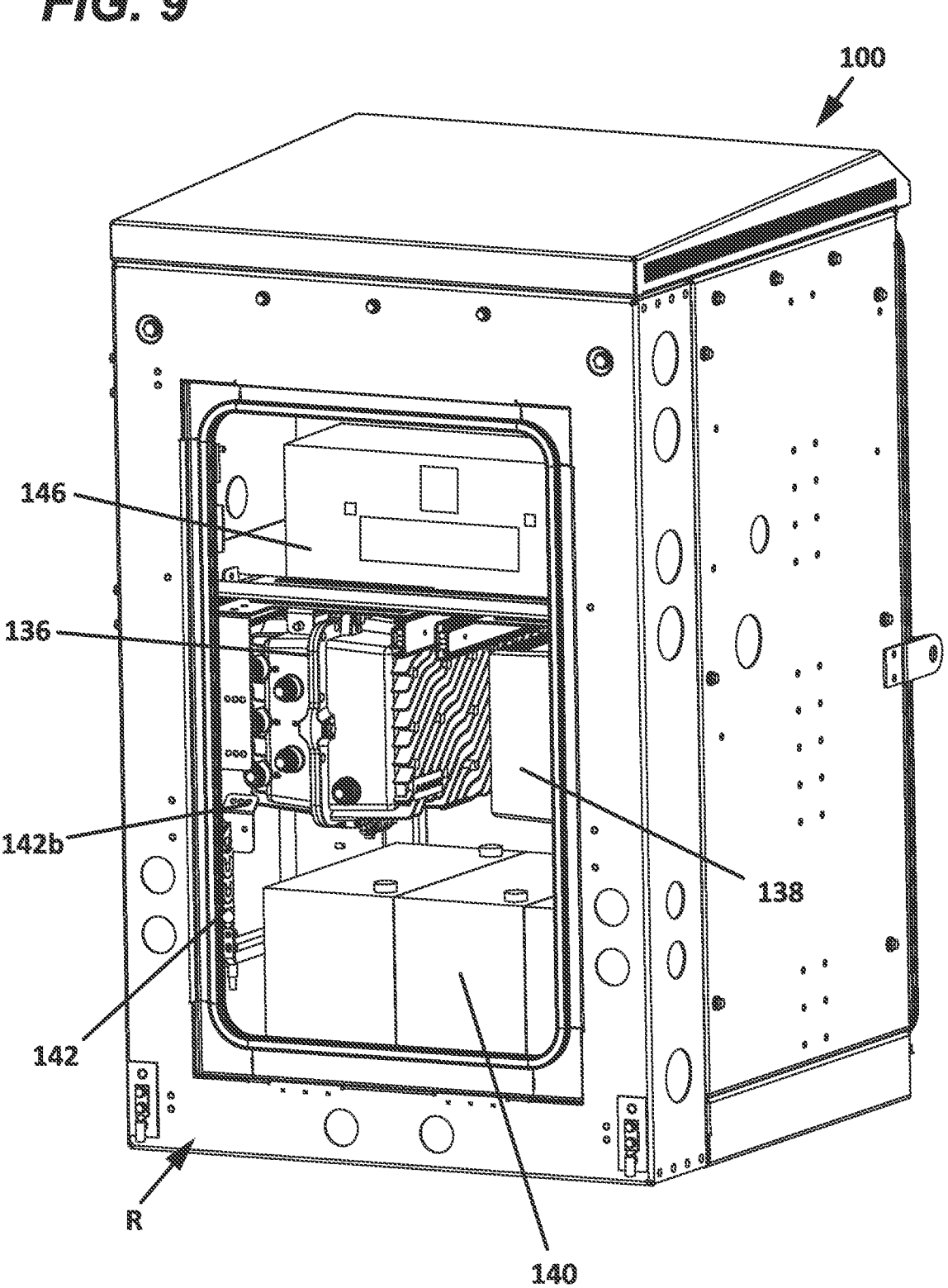
Figure 10:
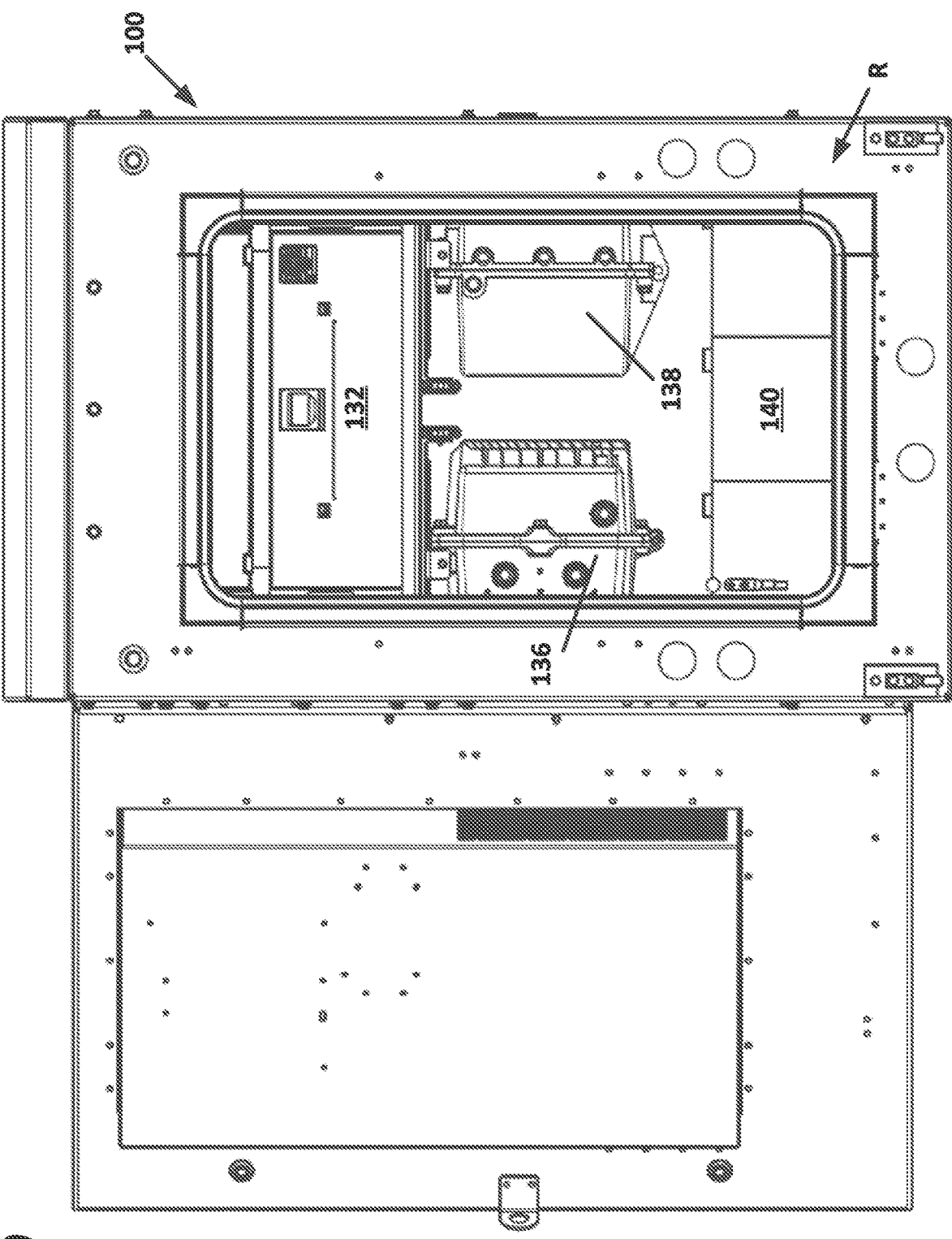
Figure 11:
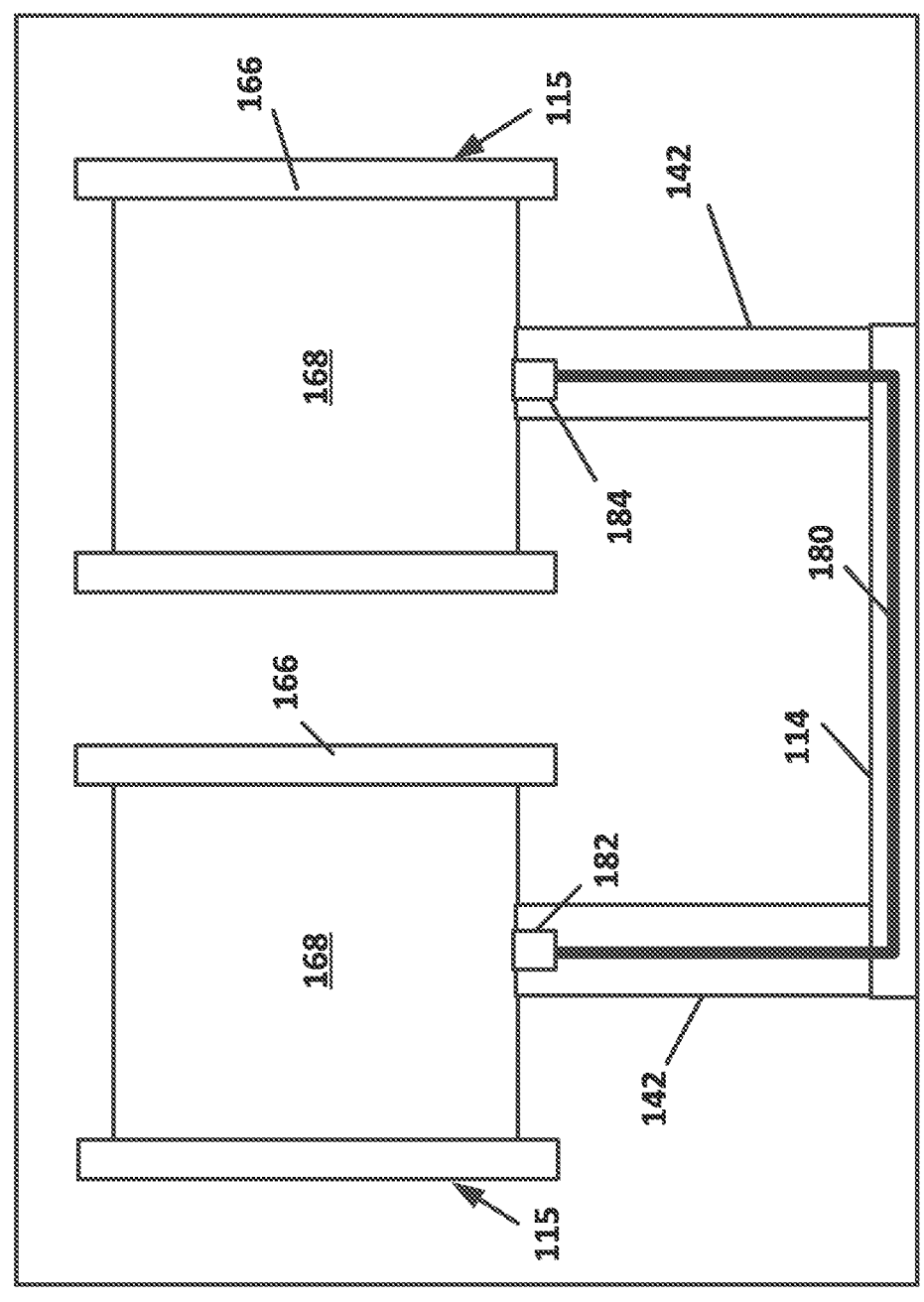
Figure 12:

FIG. 8 is a rear perspective view of the cabinet of FIG. 4 showing one of the articulating cable guides extended;

FIG. 9 shows the cabinet of FIG. 8 with the articulating cable guide retracted and a Vhub disposed at the component mount;

FIG. 10 is a rear elevational view of the cabinet of FIG. 4;

FIG. 11 is a schematic view of a cross-section taken along the 11-11 line of the cabinet of FIG. 4 so that the flexible fiber guides are visible;

FIG. 12 is a front perspective view of another cabinet having multiple rows of component mounts;

Figure 13:
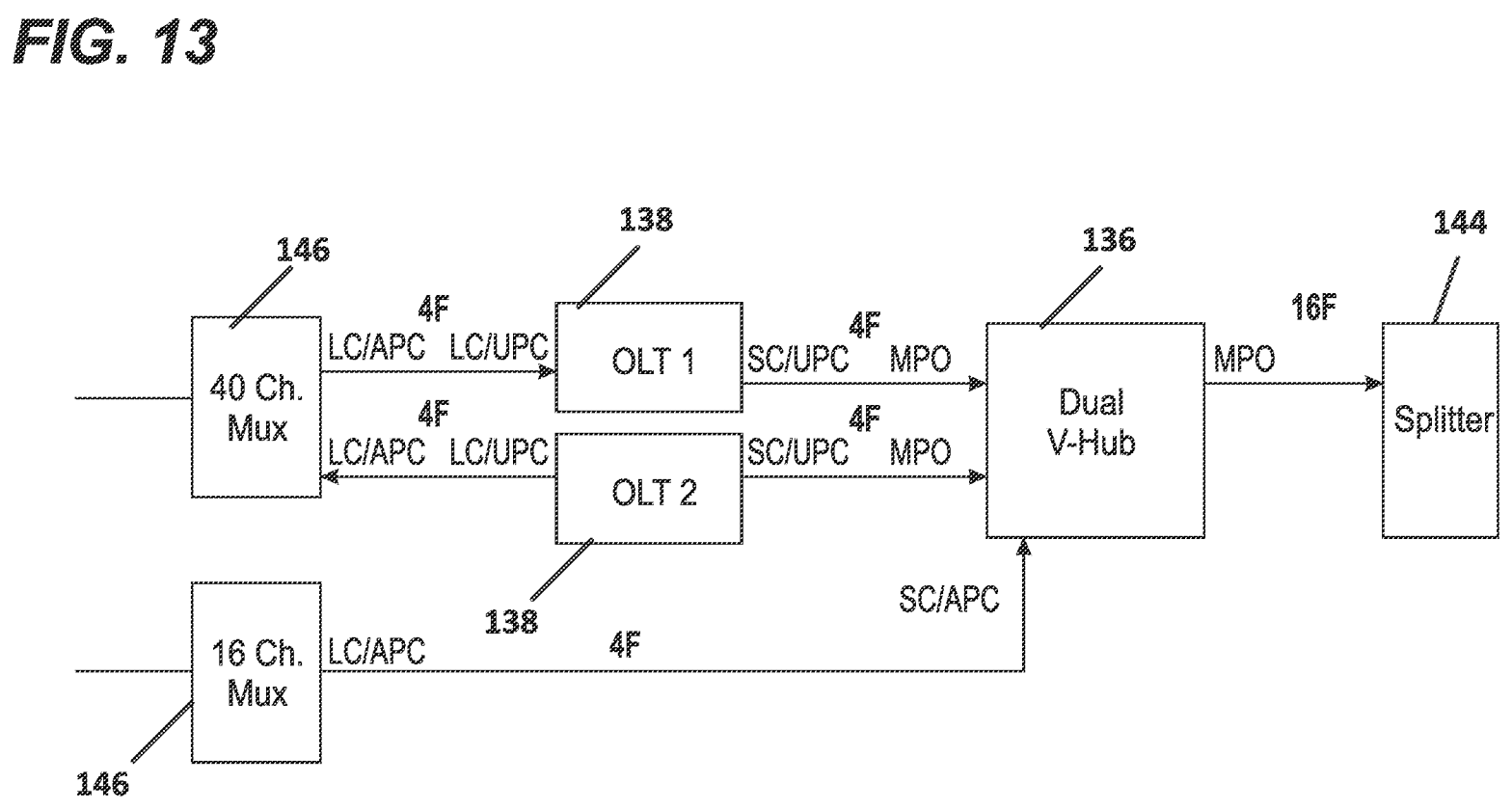

FIG. 13 is an optical circuit diagram for the cabinet of FIG. 11; and

Figure 14:
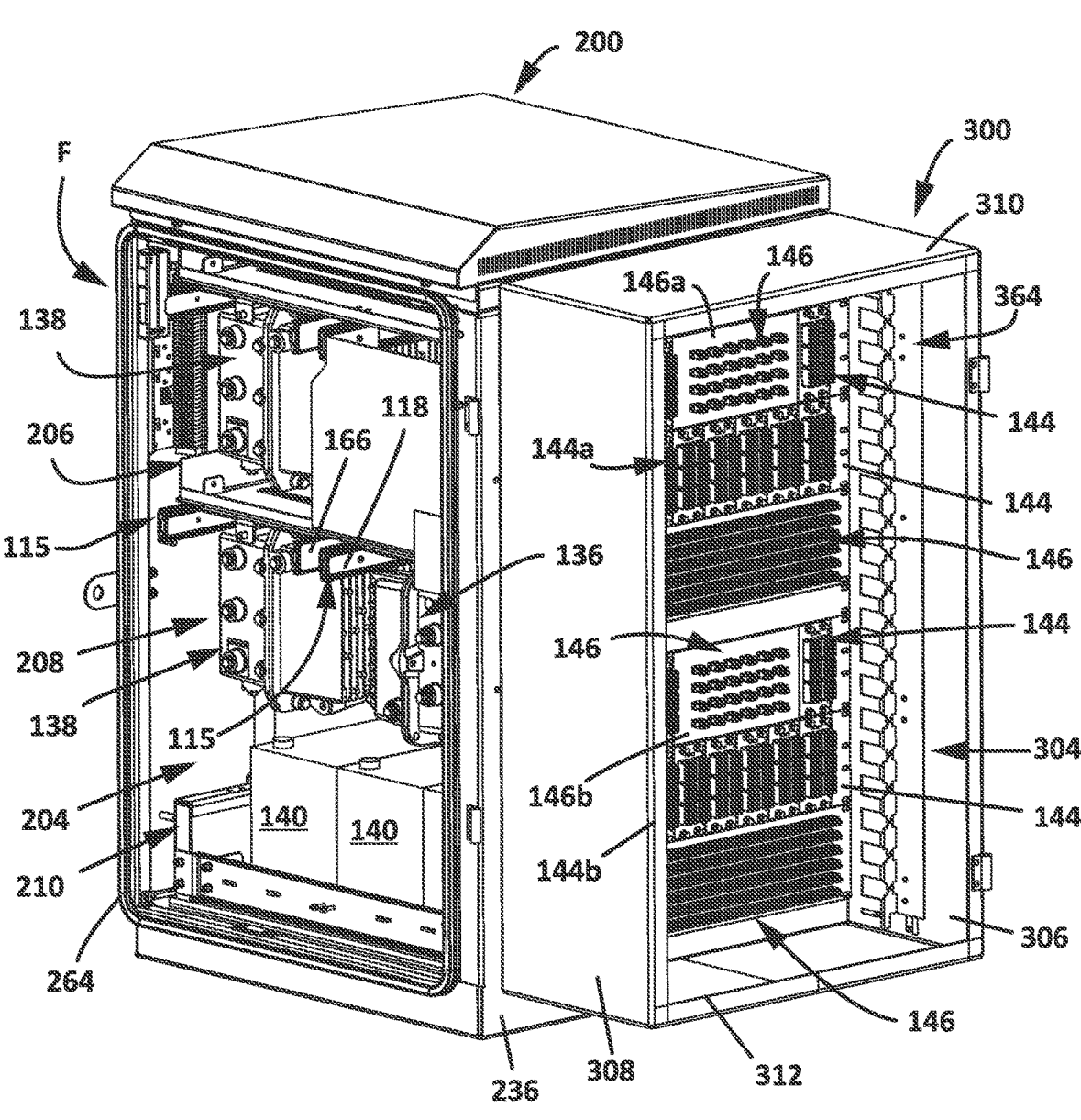
Figure 15:
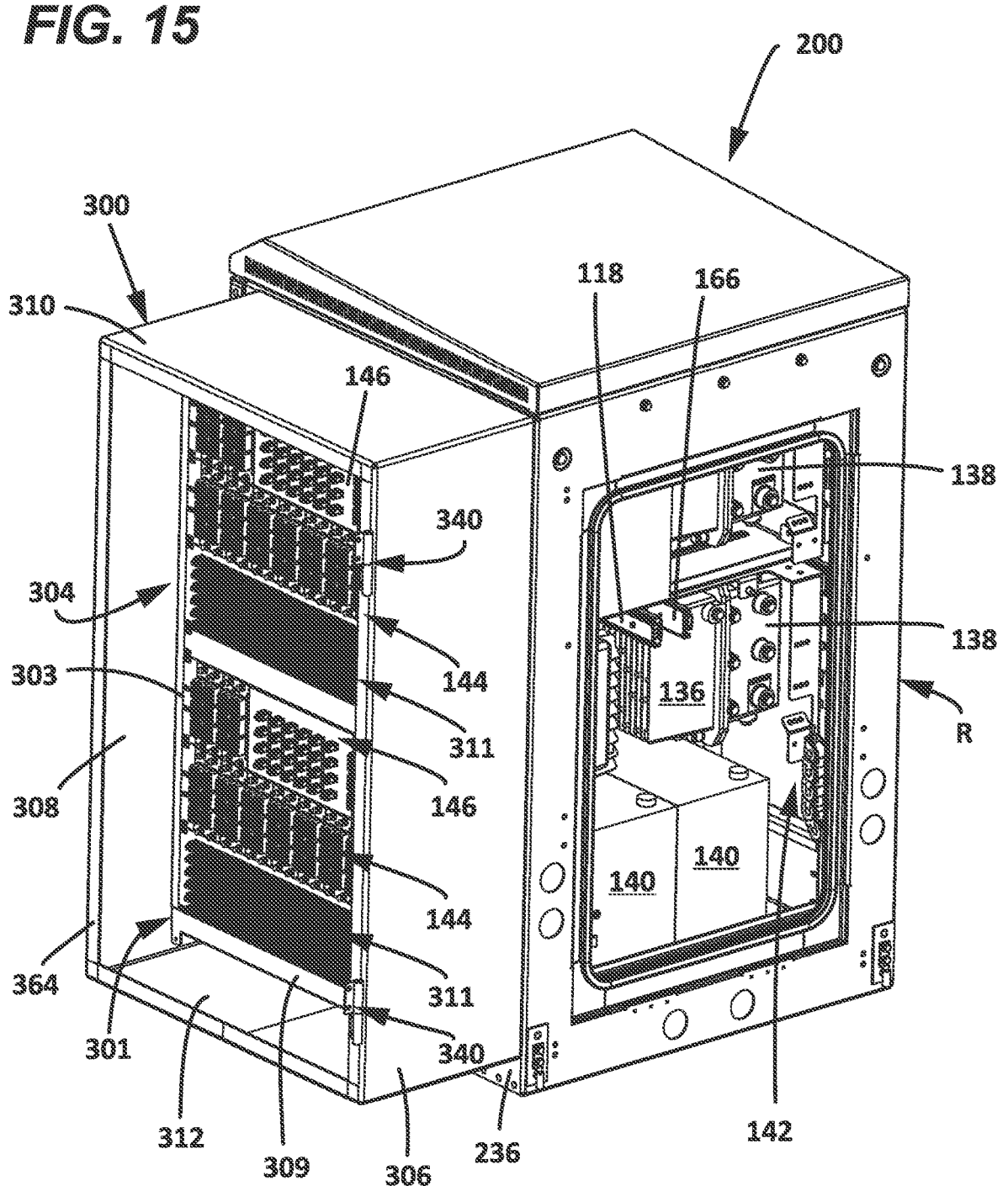
Figure 16:
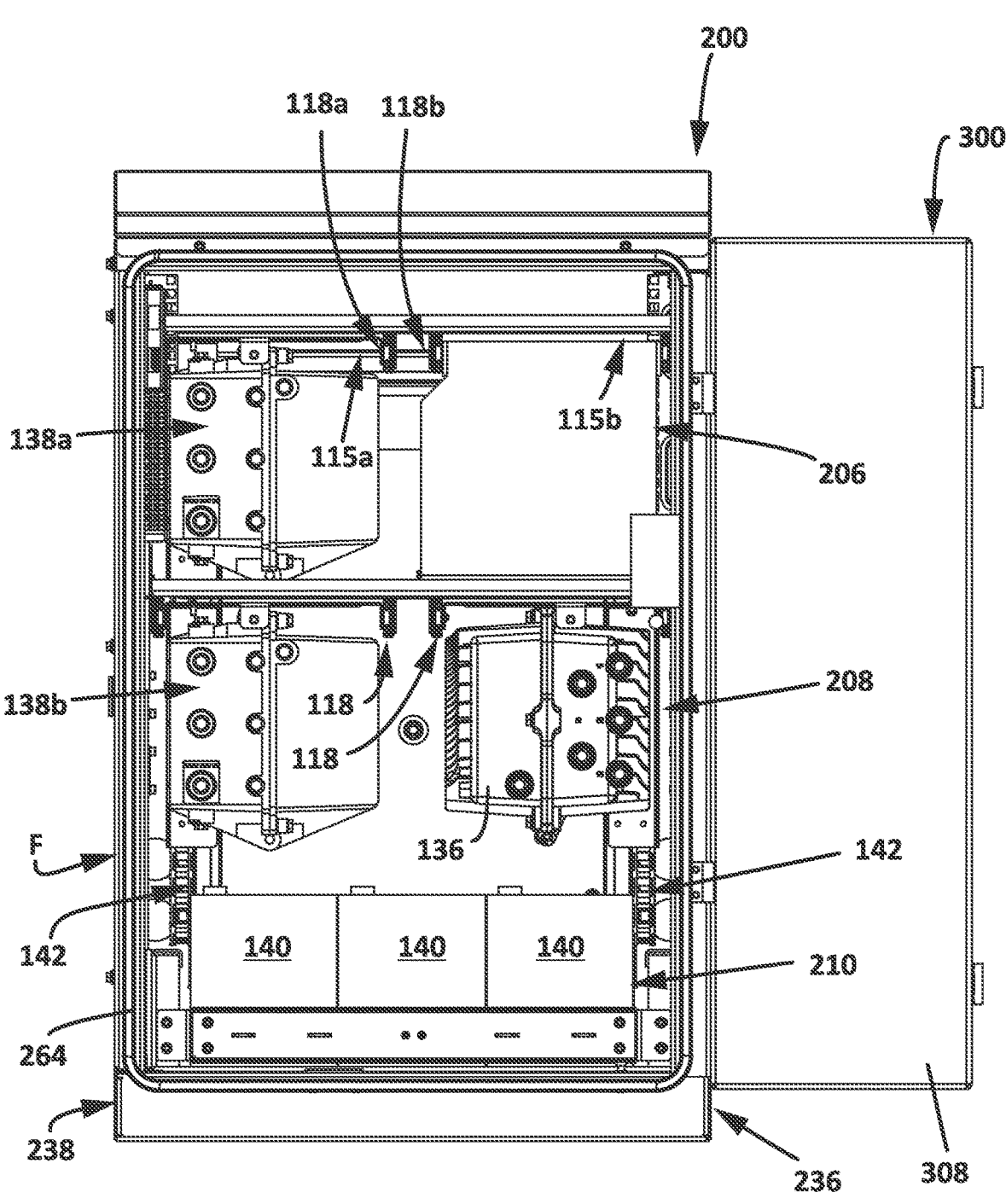
Figure 17:
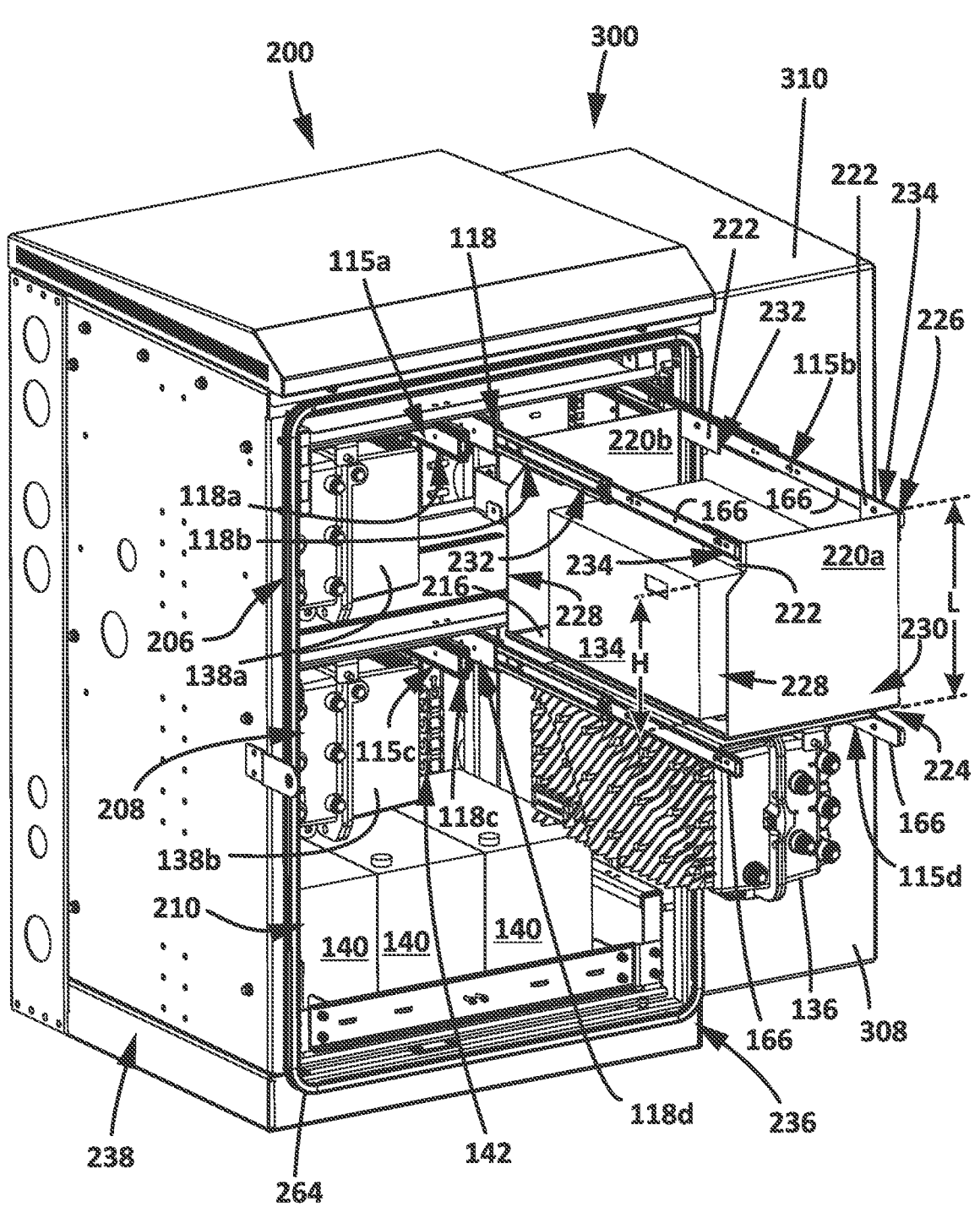
Figure 18:
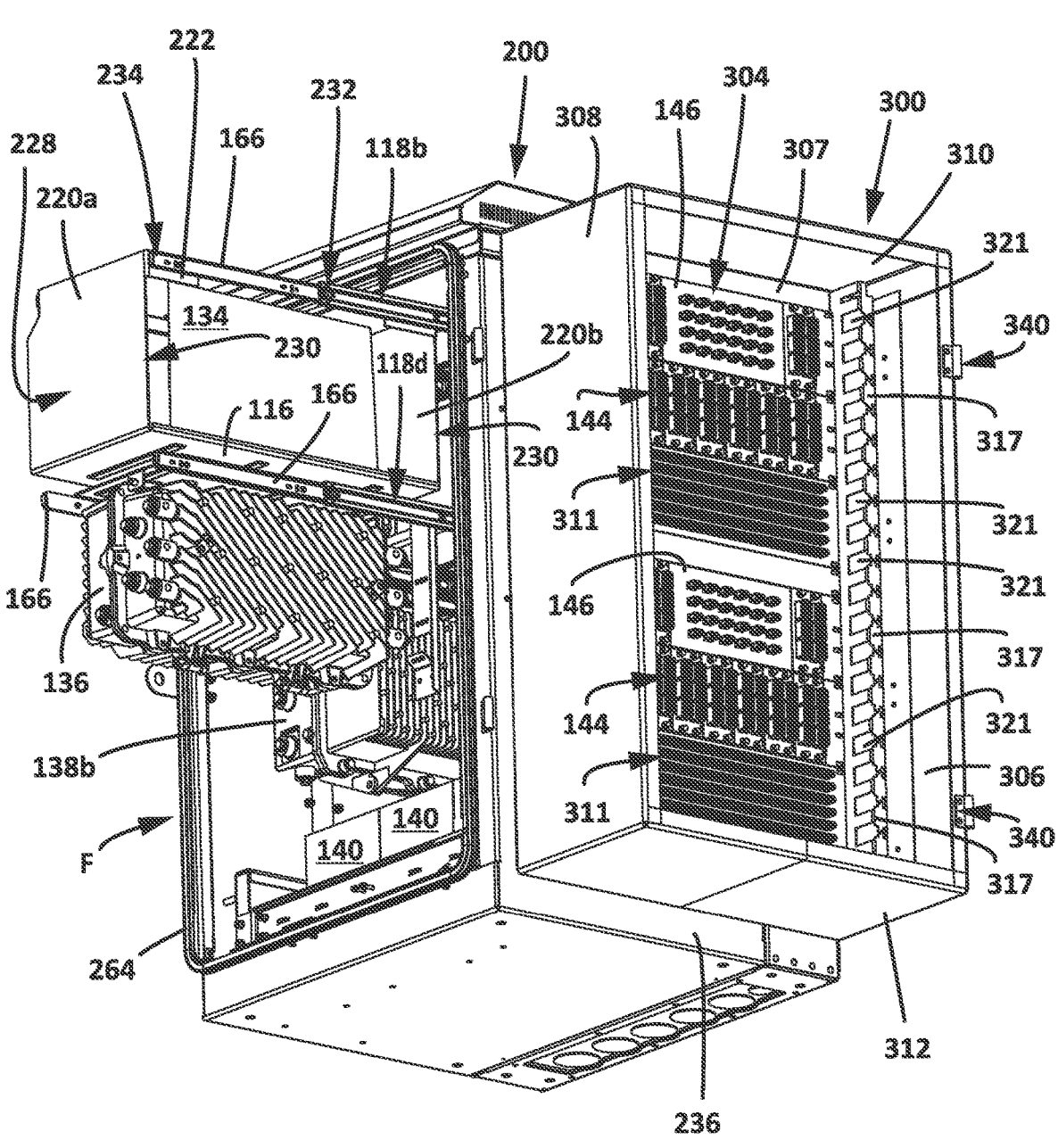
Figure 19:
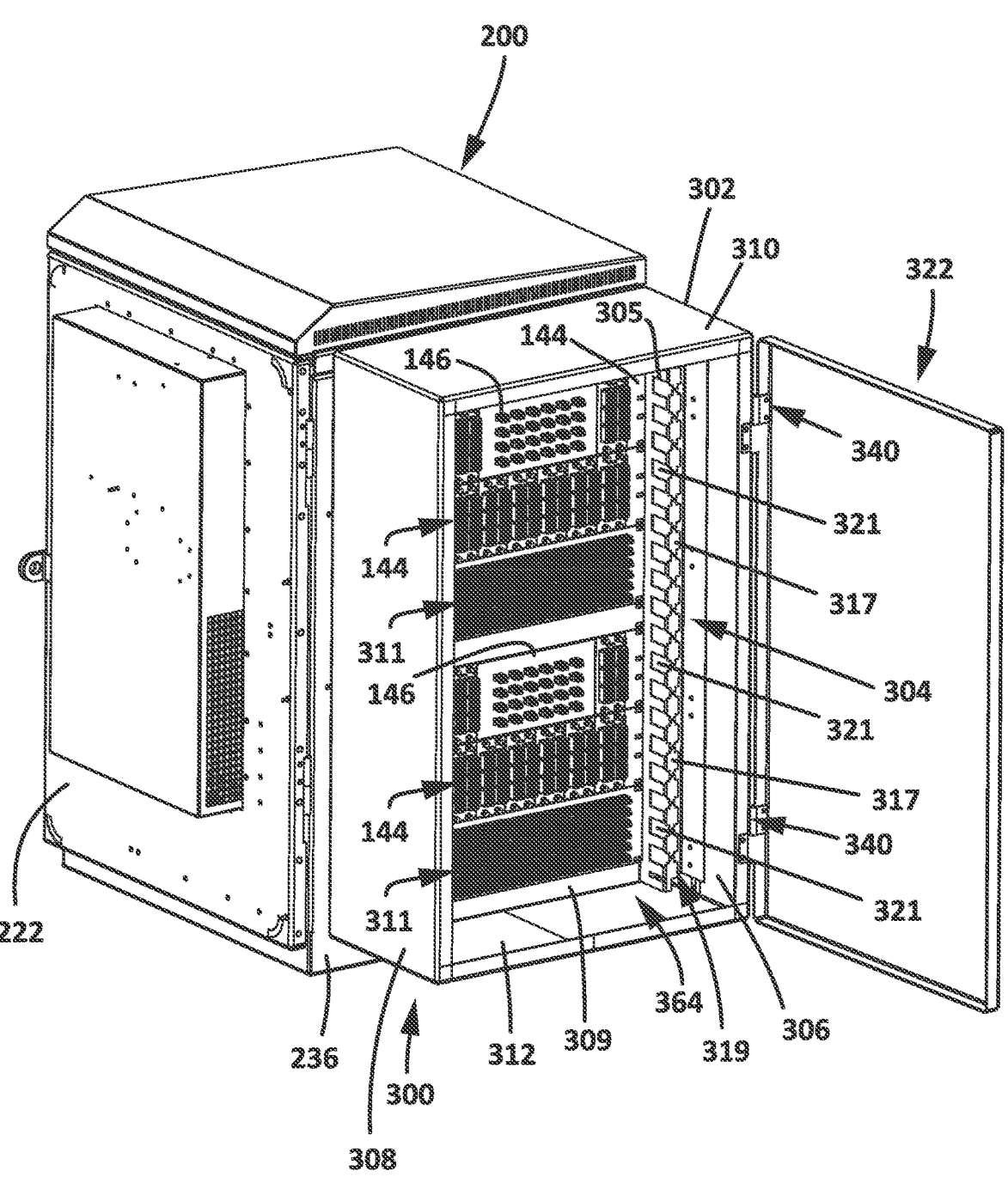
Figure 20:
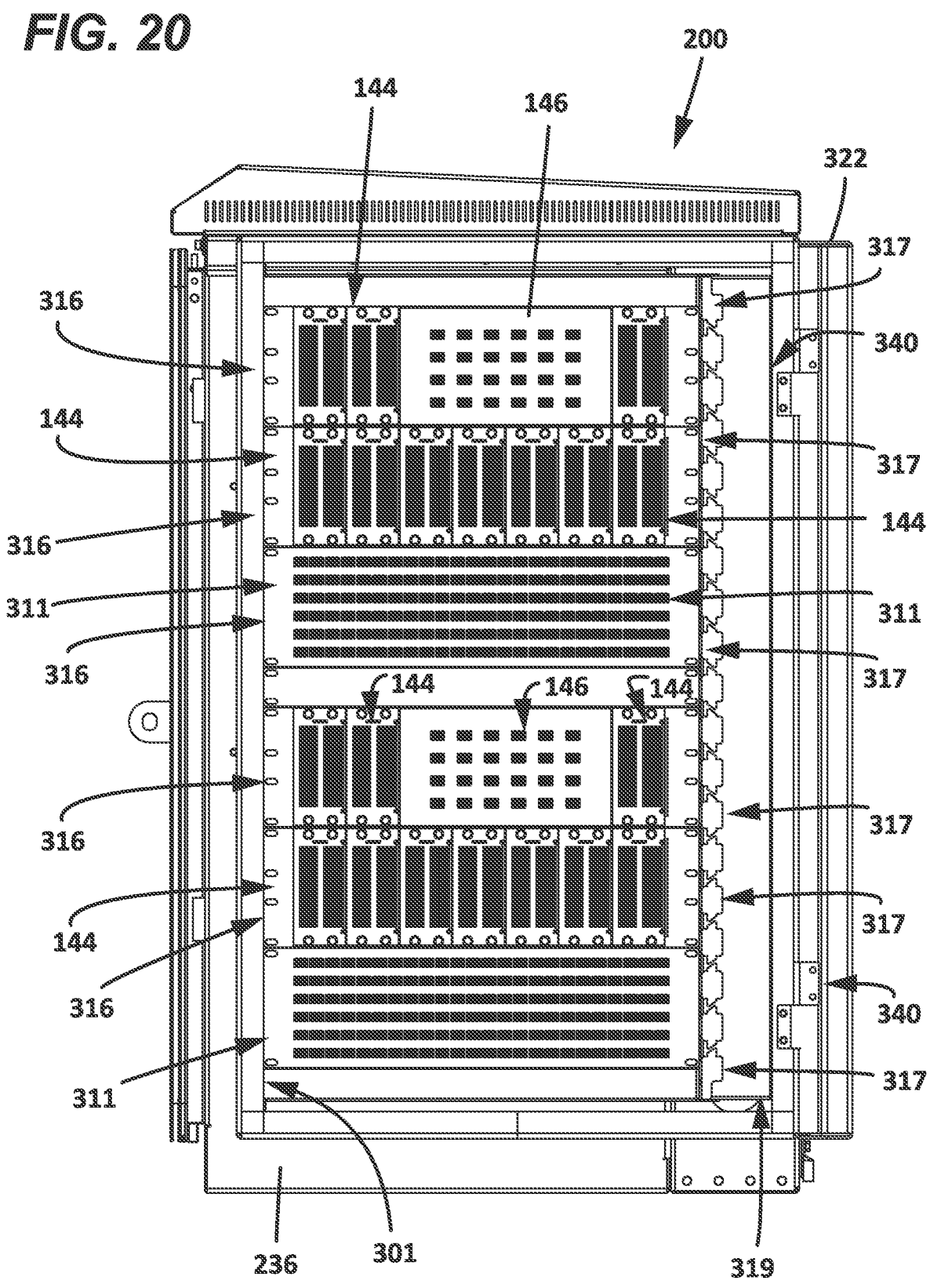
Figure 21:
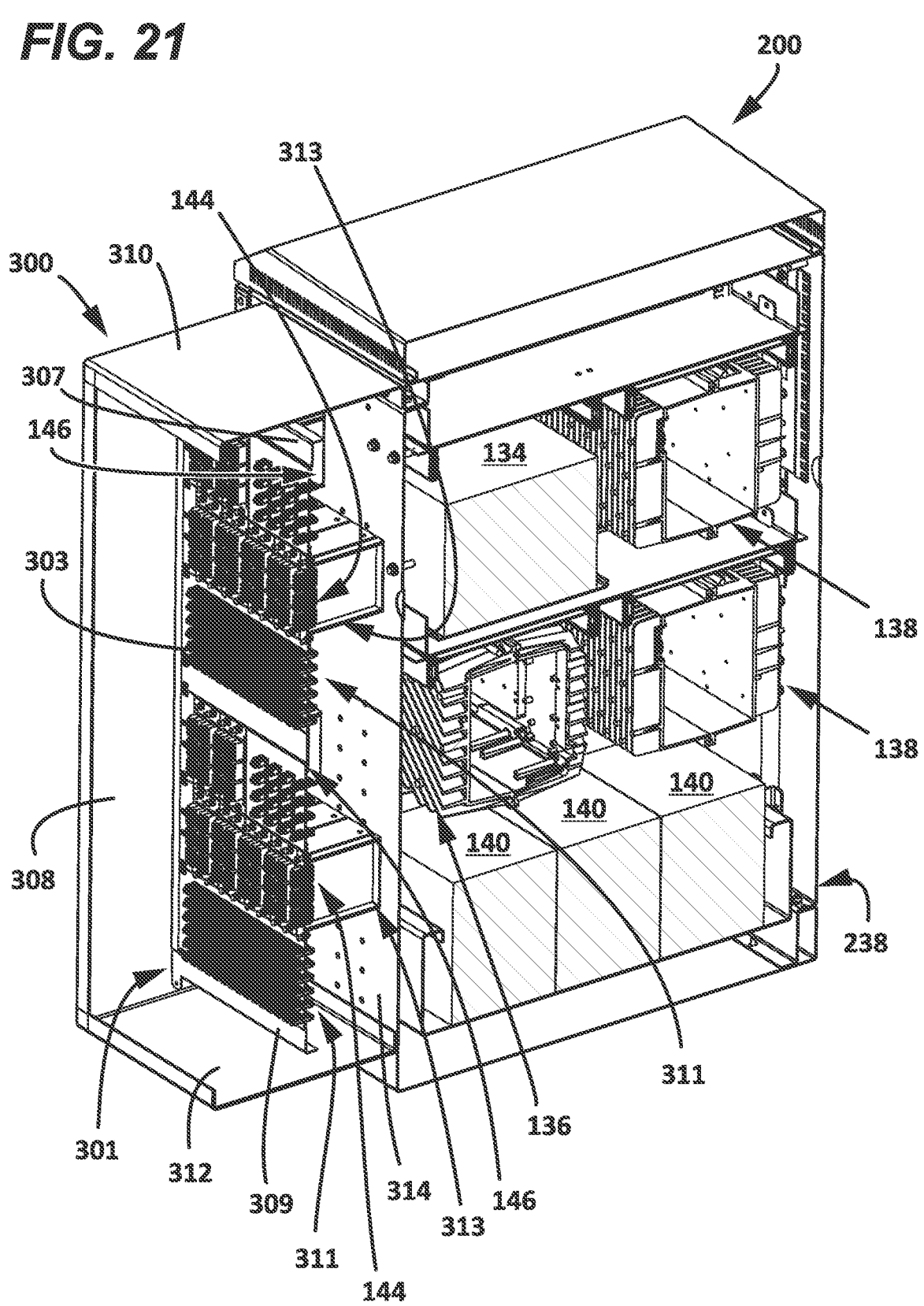
Figure 22:
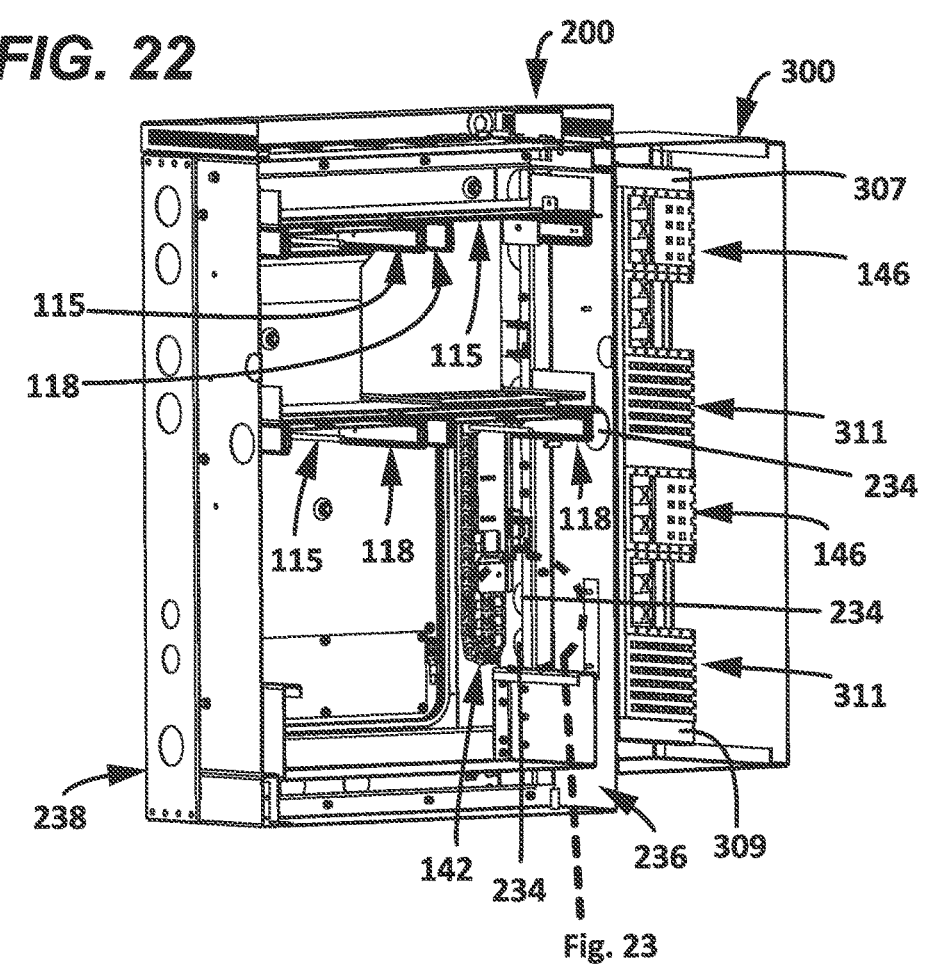
Figure 23:
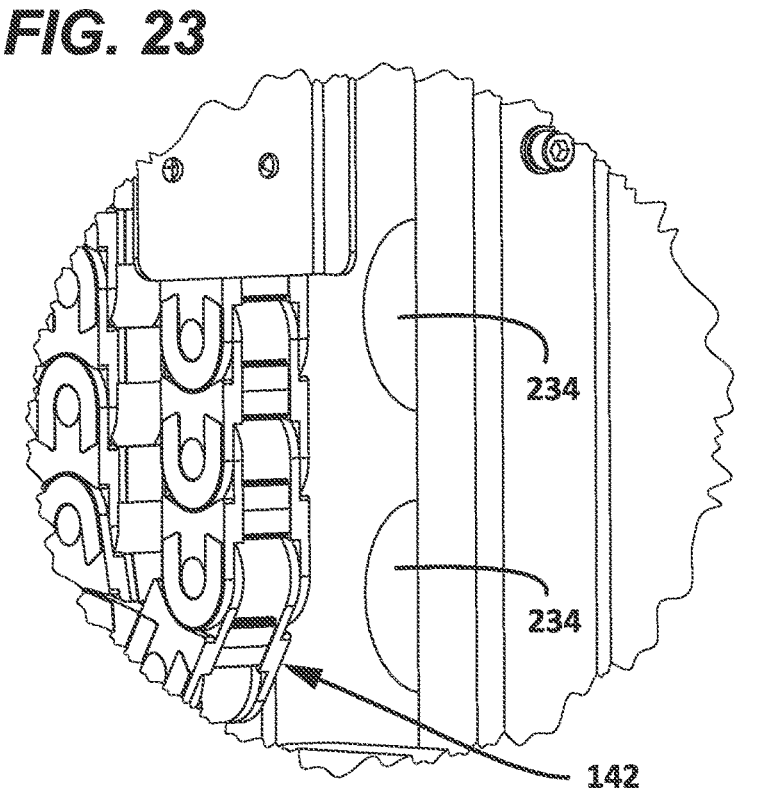
Figure 24:
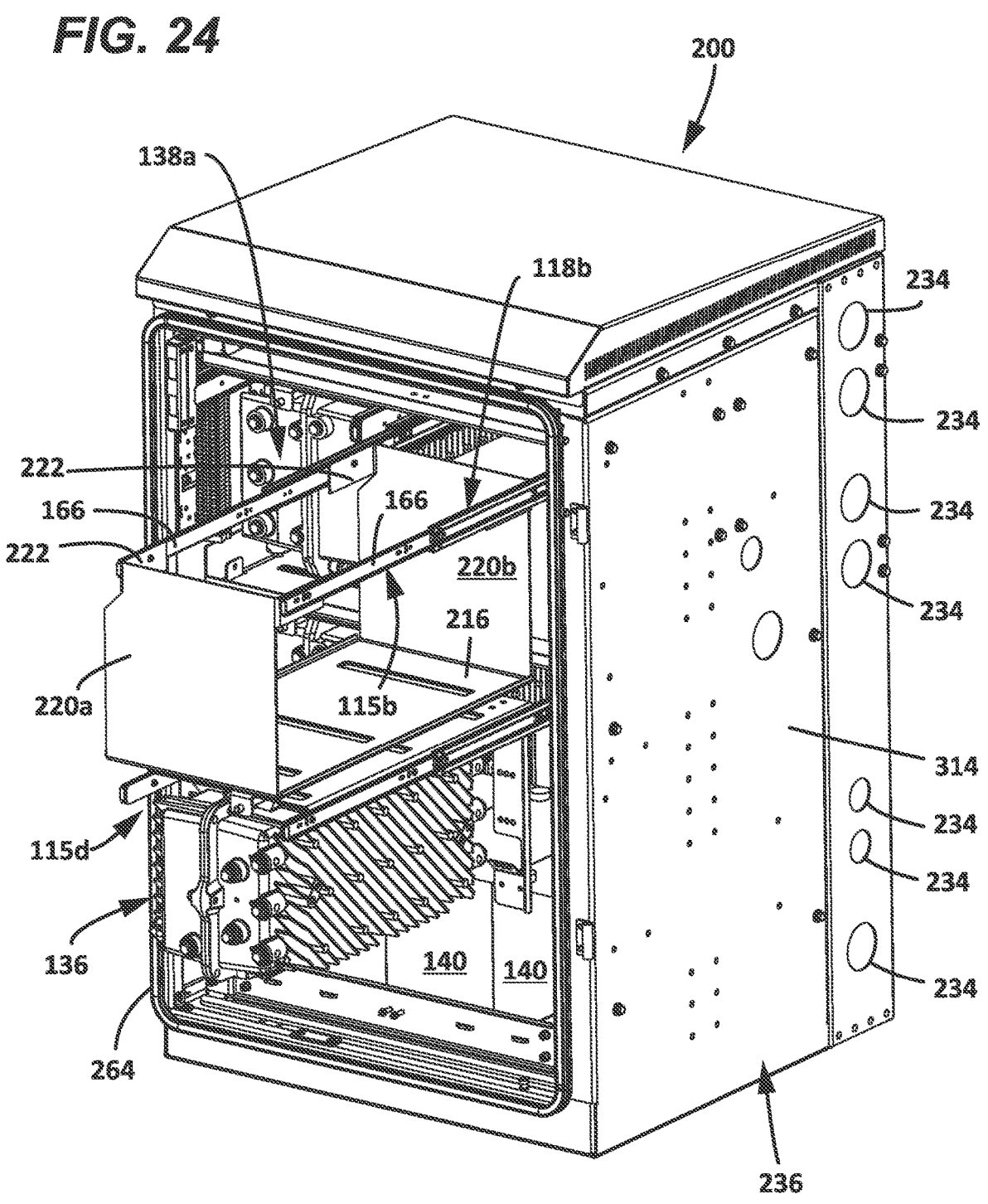

FIG. 14 is a front perspective view of another example cabinet including a side chamber in accordance with the principles of the present disclosure;

FIG. 15 is a rear perspective view of the cabinet and side chamber of FIG. 14 showing components within the cabinet and side chamber;

FIG. 16 is a front elevational view of the cabinet of FIG. 14;

FIG. 17 is a perspective view of the cabinet and side chamber of FIG. 16 showing components, the Vhub and power supply, moved to an extended position to enhance access to the components;

FIG. 18 is a bottom perspective view of the cabinet and side chamber of FIG. 17;

FIG. 19 is a perspective view of the cabinet of FIG. 14 with a front door closed and showing the side chamber with a door open for ease in viewing the components within the side chamber;

FIG. 20 is a front elevational view of the side chamber of FIG. 14;

FIG. 21 is a cross-sectional view of the cabinet and side chamber of FIG. 15;

FIG. 22 is a perspective view of the cabinet and side chamber of FIG. 14 with the components removed from the cabinet;

FIG. 23 is an enlarged view of a portion of FIG. 22 showing cutouts defined in a sidewall of the cabinet; and FIG. 24 is a perspective view of the cabinet of FIG. 18 without the side chamber.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

The present disclosure is directed to an all-in-one cabinet having both passive optical components and active electrical components. Non-limiting examples of active electrical components can include virtual hubs (VHubs), Optical Network Terminals (ONTs), Optical Line Terminals (OLTs), active optical power splitters, tunable filters, transceivers, optical amplifiers, active Wavelength Division Multiplexing (WDM) multiplexers and demultiplexers, attenuators, optical switches, wavelength converters, and other functional modules. Non-limiting examples of passive optical components can include optical couplers, passive optical power splitters, passive WDM multiplexers and demultiplexers, optical taps, optical adapters, optical splices, optical attenuators, and filters.

The vertical space of the cabinet 100 (e.g., first cabinet) can be divided into four levels including a first level 106, a second level 108, a third level 110, and a fourth level 112. The first level 106 is at the top of the cabinet 100 and provides a region for mounting passive optical components, such as passive optical splitter modules 144. The second level 108 is directly below the first level 106 and includes a power supply 134 accessible from the front F of the cabinet 100. A module mounting chassis 132 may be secured at the second level 108 behind the power supply 134. One or more modules (e.g., multiplexing/demultiplexing (MUX/DE-MUX) modules 146) can be loaded into the module mounting chassis 132 from the rear R of the cabinet 100.

The third level 110 is positioned directly below the second level 108 and is adapted for mounting an optical line terminal (OLT) 138 and a virtual hub (Vhub) 136. Optical line terminals (OLTs) function as service provider endpoints to a network. Certain types of OLTs convert between electrical and optical signals. Certain types of OLTs may provide multiplexing between the service provider and the subscribers. Virtual hubs are outside plant nodes configured to replicate and extend headend functionality to remote locations (e.g., rural areas, new businesses, home developments, etc.). Virtual hubs typically include terminals that can be mounted by themselves or near fiber distribution hubs. Virtual hubs provide wireless and PON delivery support to such areas without expensive brick-and-mortar construction. The OLT 138 and Vhub 136 receive power from the power supply 134 at the second level 108. In one example, the OLT 138 is the ADTRAN 9504N Remote OLT offered by ADTRAN of AL. In another example, the OLT is the XE4202 Remote OLT offered by CommScope Inc. of North Carolina. In one example, the Vhub 136 is the ARRIS NH/VH4000 Series Virtual Hubs (VHub) manufactured by Commscope/Arris (e.g., VHUB Model NH4000-UVP2).

The fourth level 112 is positioned directly below beneath the third level 110 and is located at the bottom of the cabinet 100. In one example, the fourth level 112 includes a plurality of batteries 140 that are electrically connected to the power supply 134.

Figure 2:
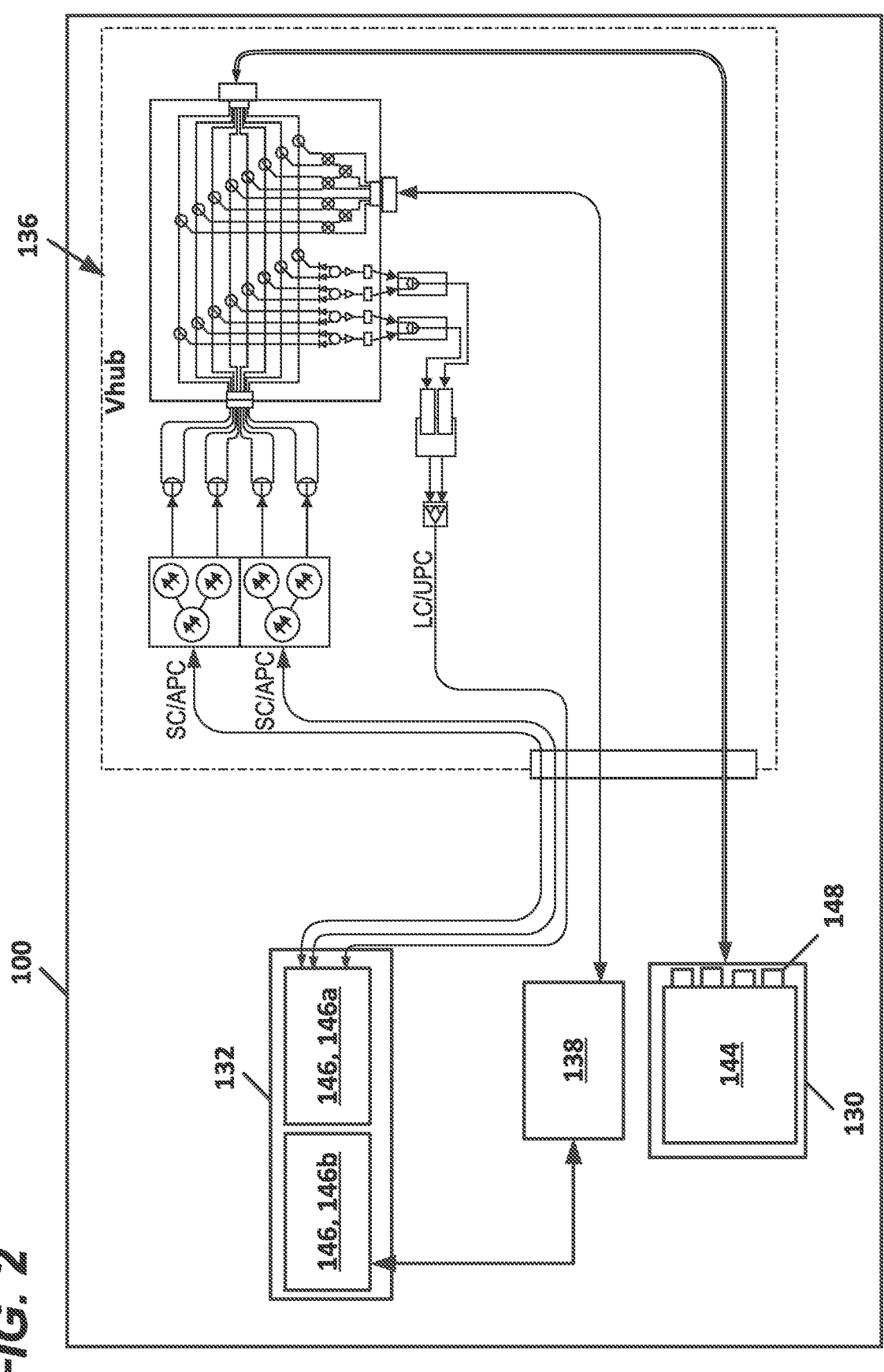
FIG. 2 is an optical circuit diagram of the cabinet of FIG. 1.

As shown in FIG. 2, signals (e.g., optical signals and/or electrical signals) from the service provider are routed into the cabinet 100 and directed to the MUX/DE-MUX modules 146 (e.g., wave division multiplexers) at the module mounting chassis 132 at the second level 108 of the cabinet 100. Signals from at least a first of the MUX/DE-MUX modules 146a are routed directly to the Vhub 136. Signals from at least a second of the MUX/DE-MUX modules 146b are routed first to the OLT 138 and then to the Vhub 136. The Vhub 136 outputs optical signals to the splitter modules 144 or other optical components at the first level 106 of the cabinet 100. Optical signals are power split at the splitter modules 144 and can subsequently be directed towards subscribers via cables plugged into the splitter outputs.

Figure 3:
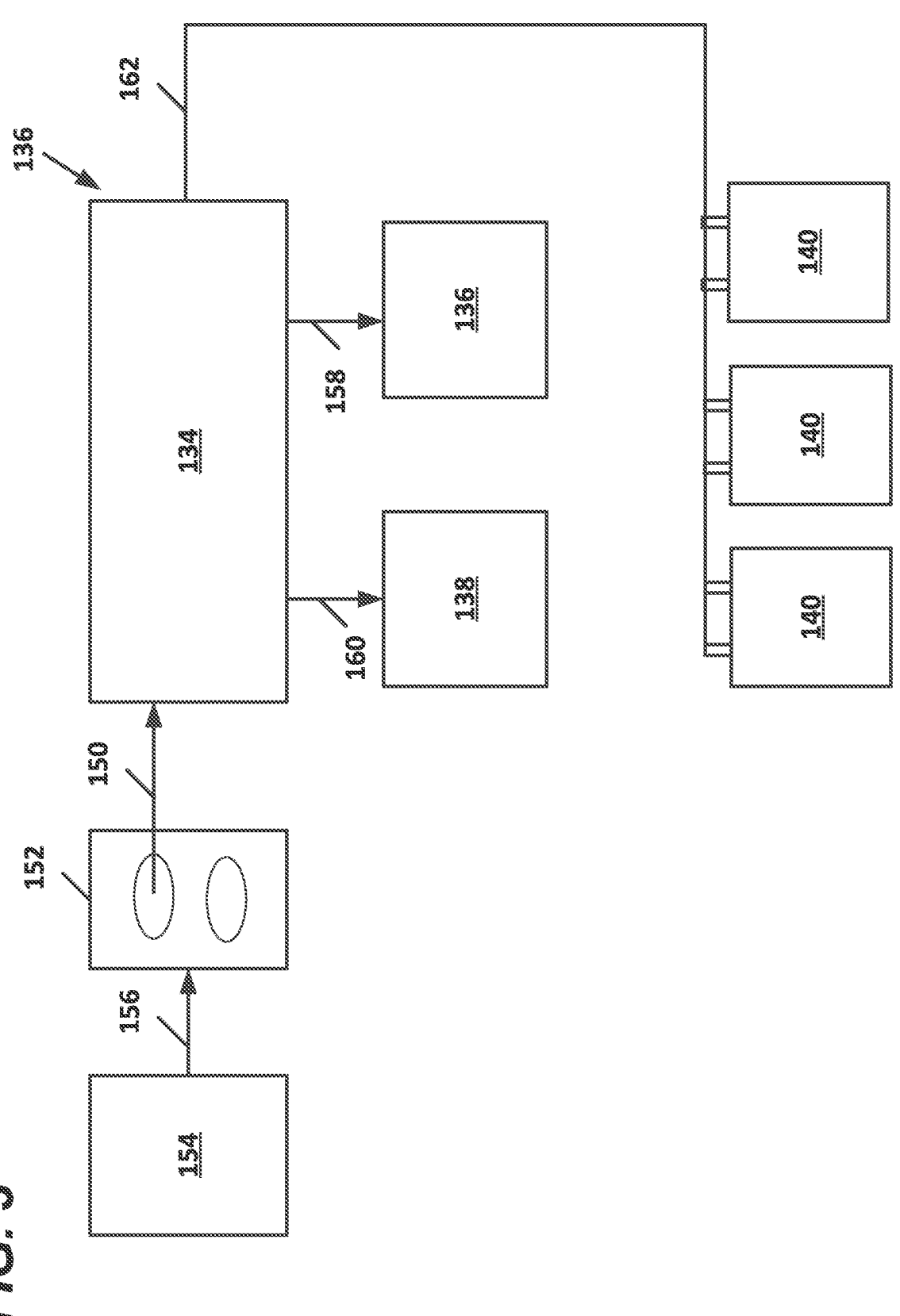
FIG. 3 is a power circuit diagram of the cabinet of FIG. 1.

FIG. 3 shows how power is distributed through the cabinet 100. In certain implementations, the power supply 134 includes a 110 V power supply adapted to be connected to a commercial power source, such as line power. The power supply 134 can include a power input cord 150 that plugs into an outlet 152 (e.g., a 110 V outlet) within the cabinet 100. The outlet 152 within the cabinet 100 can be coupled to a commercial power line 154 such as line power via a cable 156. The power source 134 can output power through a cable 158, 160 such as an F50 coaxial cable. The power source 134 can include a plurality of F50 coaxial cables 158, 160 for providing power to active components such as the Vhub 136 and/or and the OLT 138. The power supply 134 maintains the batteries 140 in a charged state via a wiring harness 162 such that the batteries 140 are available for use in the event of a power failure. In this way, the batteries 140 function to provide back-up power to the OLT 138 and the Vhub 136.

Figure 5:
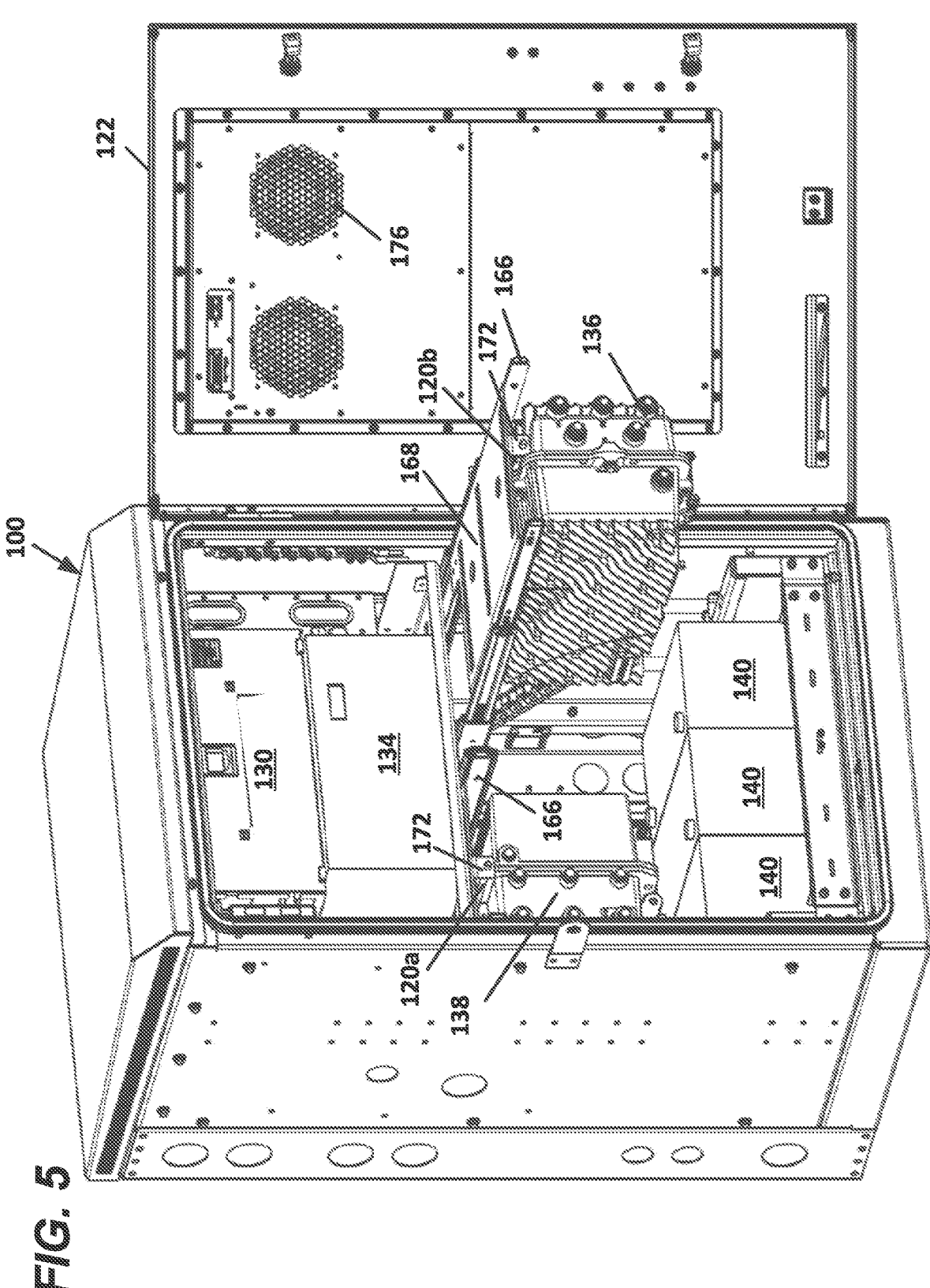
FIG. 5 is a perspective view of the cabinet of FIG. 4 showing a component, the Vhub, moved to an extended position to enhance access to the component.
Figure 6:
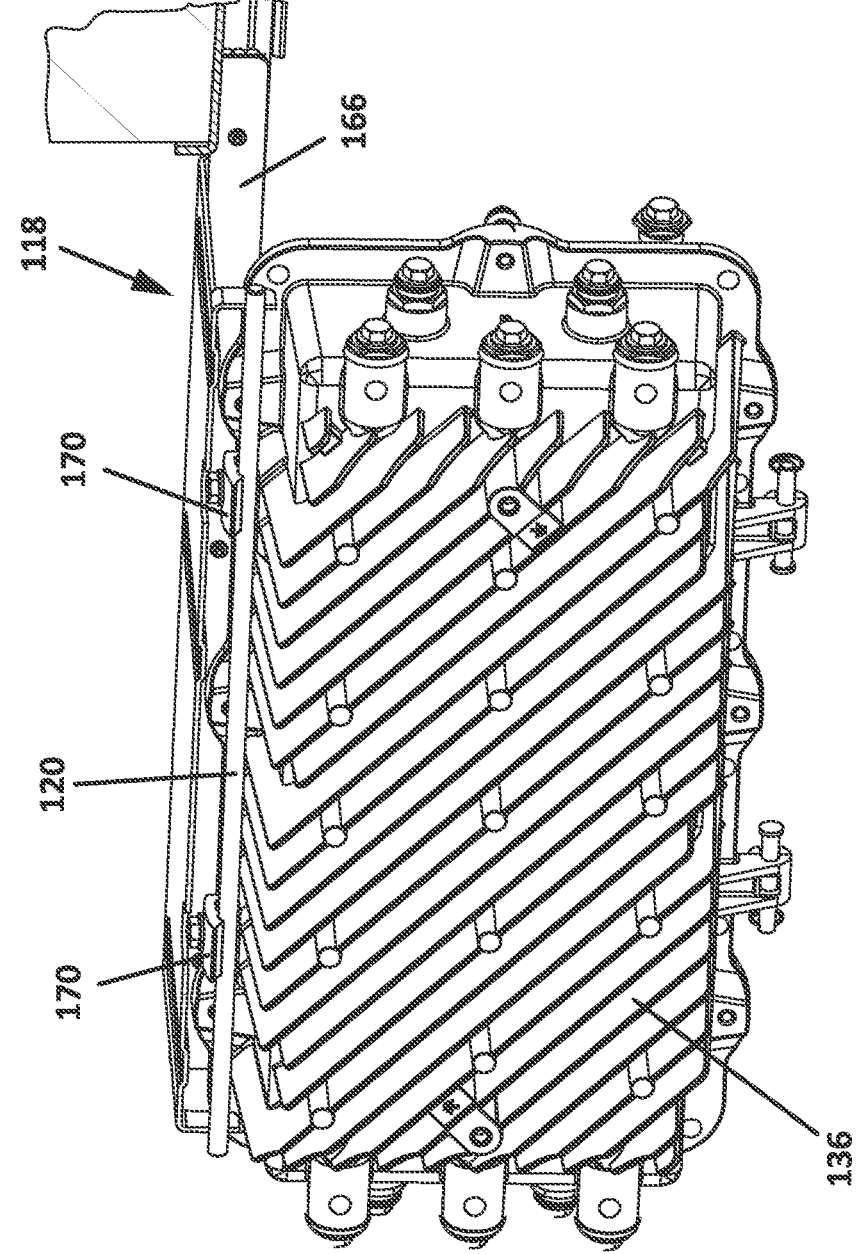
FIG. 6 is an enlarged view of the component of FIG. 5 showing how the component is attached to a component mount, which is down in cross-section for ease in viewing.

Referring to FIGS. 4-6, in accordance with certain aspects of the disclosure, the OLT 138 and/or Vhub 136 are mounted in a manner that facilitates the access to the OLT 138 and the Vhub 136 for installation purposes and for future access for testing and troubleshooting. The ability to readily access the OLT 138 and the Vhub 136 also facilitates component upgrades. The cabinet 100 includes a component mount 115 at the third level 110 for mounting various types of communications components. In certain examples, the cabinet 100 includes multiple component mounts 115. In a preferred example, the OLT 138 and the Vhub 136 are mounted to separate component mounts 115 within the cabinet 100.

In certain implementations, the component mount 115 includes a slidable mounting configuration 118 (see FIG. 6) that allows the OLT 138, the Vhub 136, or other mounted component to be independently slid from within the interior 104 of the cabinet 100 out the front opening 164 of the cabinet 100 for ready access. In certain examples, the mounting configuration 118 allows the OLT 138 and the Vhub 136 to be slid linearly relative to the cabinet 100.

In certain implementations, the component mount 115 include a component mounting rod 120 to which a strand mount clamp 170 can be secured to hang a telecommunications component, such as the OLT 138 and/or the Vhub 136, beneath the component mounting rod 120. In certain examples, the component mounting rod 120 extends horizontally along the cabinet 100 in a front-to-rear orientation FR.

In certain implementations, a component mounting rod 120 is supported by a linear slide mechanism 118 that is movable between an extended position and a retracted position. In certain examples, the slide mechanism 118 moves along the front-to-rear orientation FR when moving between the extended and retracted positions. The component mounting rod 120 is carried by the linear slide mechanism 118 as the linear slide mechanism 118 is moved between the first and second positions. The component mounting rod 120 is fully within the interior 104 of the cabinet 100 when the linear slide mechanism 118 is in the retracted position. At least a portion of the component mounting rod 120 is positioned outside the cabinet 100 via extension of the linear slide mechanism 118 through the access opening 164 when the linear slide mechanism 118 is in the extended position. In certain examples, the component mounting rod 120 is fully outside the cabinet 100 when the linear slide mechanism 118 is in the extended position.

In certain implementations, the linear slide mechanism 118 is allows the component mounting rod 120 to move relative to the shelf 116 on which the power supply 136 seats. In one example, the slidable mounting configuration 118 is secured to an underside of the shelf 116 that supports the power supply 134.

In certain examples, the slidable mounting configuration 118 includes one or more linear slides 166, such as drawer slides, for allowing linear motion. A horizontal panel 168 is coupled to the linear slides 166 such that the linear slides 166 allow the horizontal panel 168 to be moved relative to the shelf 116. In certain examples, the horizontal panel 168 is secured at opposite left and right edges to sets of linear slides 166. In the example shown, the linear slides 166 includes slide members that can telescopically slide relative to one another. The slides 166 allow the panel 168 to be slid fully out from the interior 104 of the cabinet 100, and also allow the panel 168 to be slid fully inside the cabinet 100.

A horizontal component mounting rod 120 is secured to the horizontal panel 168 to move with the horizontal panel 168. In certain examples, the rod 120 is vertically offset from the underside of the horizontal panel 168. In certain examples, the mounting rod 120 extends in the front-to-rear orientation FR. In certain implementations, the component mounting rod 120 is secured to the horizontal panel 168 by front and rear tabs 172 that project downwardly from the horizontal panel 168. A telecommunications component, such as the OLT 138 and/or the Vhub 136 can be hung beneath the mounting rod 120 using one or more strand mount clamps 170.

When the linear slide mechanism 118 is disposed in the retracted position, the horizontal panel 168 is fully within the interior 104 of the cabinet 100 and positioned beneath the shelf 116 and a second position in which the linear slide 166 extends forwardly through front access opening 164 and at least a majority of the horizontal panel 168 is located outside the cabinet 100. In certain examples, the slide mechanism 118 is rated to support at least 45 kilograms.

In certain implementations, the component mounting rod 120 is a first component mounting rod 120a and the linear slide mechanism 118 is a first linear slide mechanism 118a. The cabinet 100 also includes a second component mounting rod 120b supported by a second linear slide mechanism 118b. In the example shown, the OLT 138 is mounted to the first linear slide mechanism 118a and the Vhub 136 is mounted to the second linear slide mechanism 118b. In certain examples, the first and second linear slide mechanisms 118a, 118b are installed side-by-side within the cabinet 100 at the third level 110. The first and second component mounting rods 120a, 120b are parallel to each other. The first and second slide mechanisms 118a, 118b both slide along the same orientation FR when moving between the extended and retracted positions.

The first and second slide mechanisms 118a, 118b are independently movable between the extended and retracted positions. Accordingly, the Vhub 136 can be accessed independently of the OLT 138. Similarly, the OLT 138 can be accessed independently of the Vhub 136.

Figure 1:
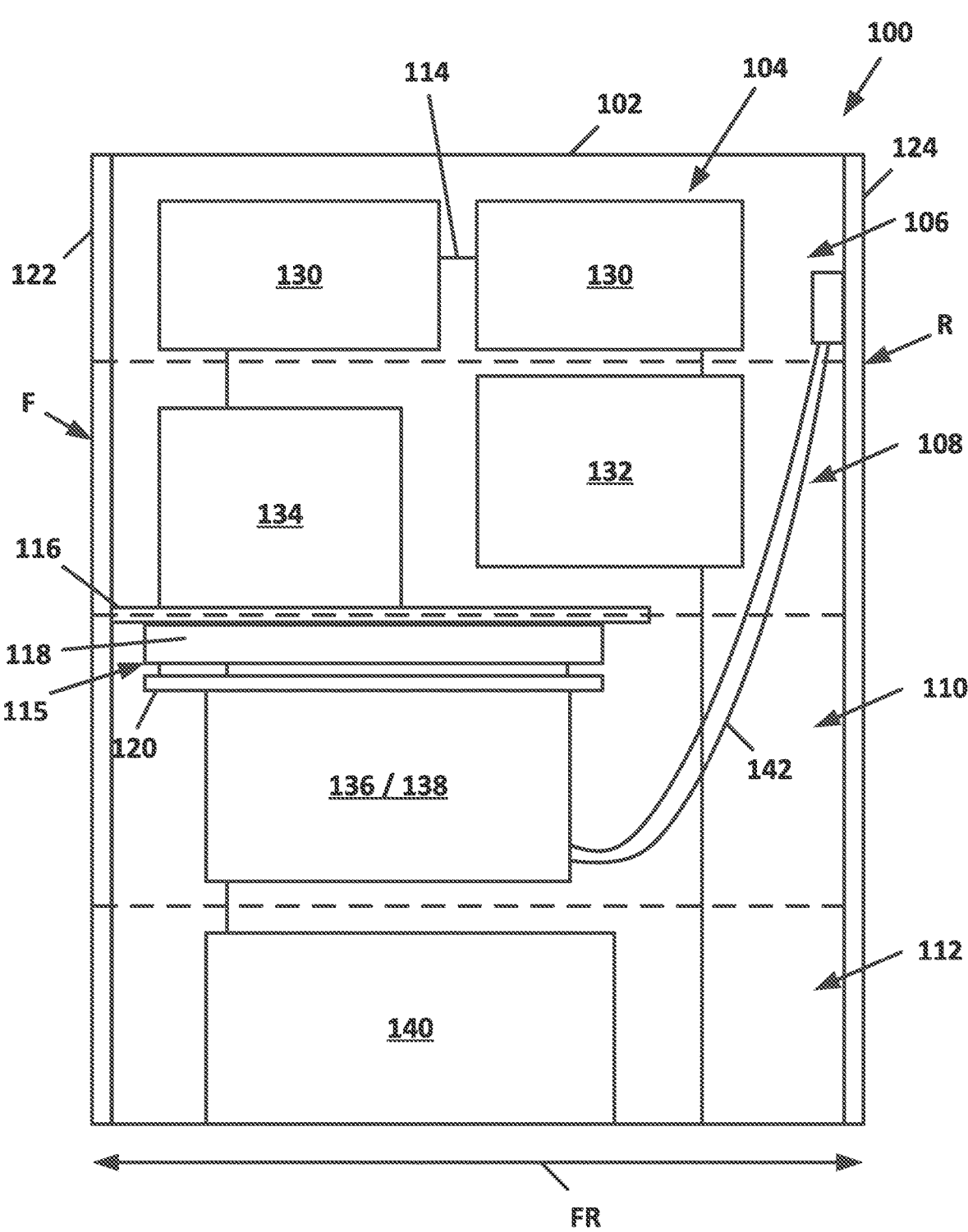
FIG. 1 is a schematic diagram of an example cabinet configured in accordance with the principles of the present disclosure.
Figure 7:
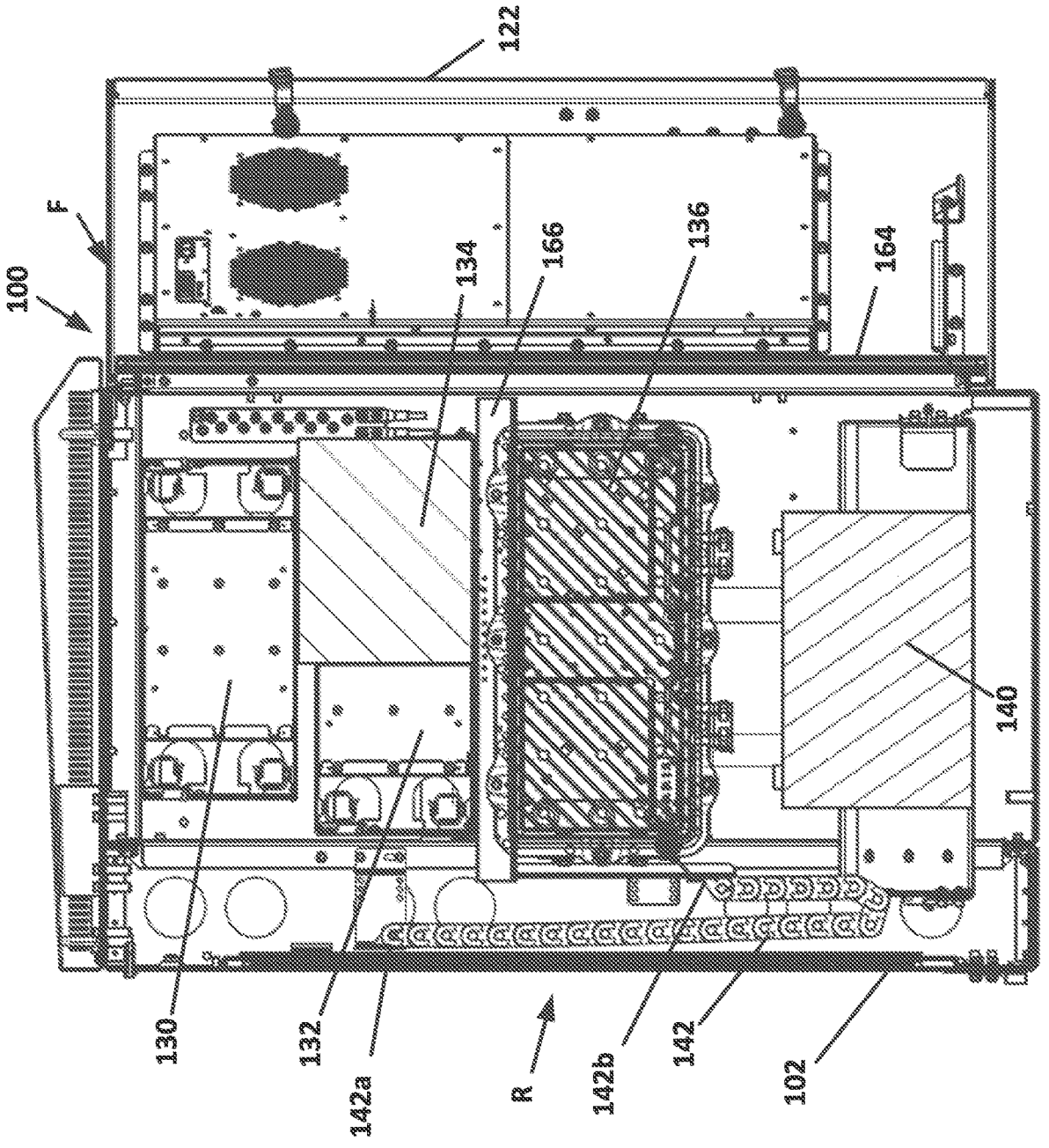
FIG. 7 is a cross-sectional view of the cabinet of FIG. 4 with a front of the cabinet facing the right side of the sheet and a rear of the cabinet facing the left side of the sheet.

In certain implementations, optical fibers are routed between the components at the first and second levels 106, 108 (e.g., passive optical splitter modules 144 and MUX/ DE-MUX modules 146) and the components at the third level 110 (e.g., the OLT 138 and the Vhub 136). One or more flexible fiber routing devices 142 (see FIG. 1) can be routed between the levels 106, 108, 110 to protect the optical fibers. For example, at least a first flexible fiber routing device 142 can be routed between the first level 106 and the third level 110 and at least a second flexible fiber routing device 142 can be routed between the second level 108 and the third level 110. In certain implementations, the flexible fiber routing devices 142 include articulated fiber guides (e.g., see FIG. 7). In certain example, the articulated fiber routing devices 142 each include a plurality of links that are pivotally connected to one another (e.g., see FIGS. 8 and 9).

It will be appreciated that the flexible fiber routing devices 142 move with the slidable component mounts as the OLT 138 and/or the Vhub 136 are slid in and out of the cabinet 100 to provide continuous protection to the fibers as the slides are moved. Each articulated fiber guide 142 has a first end 142a fixed relative to the cabinet 100 and a second end 142b that moves with a respective one of the slide mechanisms 118 relative to the cabinet 100 as the slide mechanism 118 moves between the extended and retracted positions. Thus, the ends of the flexible management structures 142 corresponding to the Vhub 136 and/or the OLT 138 move with the OLT 138 and the Vhub 136 when the OLT 138 and the Vhub 136 are independently slid relative to the cabinet 100.

In the depicted example, the first end 142a of the articulated fiber guide 142 is disposed at the second level 108 and the second end 142b is disposed at the third level 110. Accordingly, fibers can be routed along the fiber guide 142 between the MUX/DE-MUX modules 146 and the Vhub 136 and/or the OLT 138. In other examples, the first end 142a may be disposed at the first level 106. Accordingly, fibers can be routed along the guide 142 between the splitters 144 and the Vhub 136.

Fibers also can be routed between the Vhub 136 and the OLT 138. In certain implementations, such fibers also may be protected by the articulated fiber guides 142. For example, as shown in FIG. 11, one or more fibers may be routed from the OLT 138, along a first one of the fiber guides 142, to a rack 114 or other area of the cabinet 100, back along a second one of the fiber guides 142, to the Vhub 136. In certain examples, a fiber optic patch cord 180 or other fibers can be routed through the first and second articulated fiber guides 142 prior to any components being mounted at the first and second component mounts 115. In certain examples, the patch cord 180 has a first connectorized end 182 at the first component mount 115 and a second connectorized end 184 at the second component mount 115. Premounting the patch cord 180 and disposing the connectorized ends 182, 184 at the component mounts 115 facilitates installation of the components.

Referring back to FIGS. 4 and 5, the cabinet 100 has a configuration that provides access to the interior 104 of the cabinet 100 from both the front F and the back R. A front door 122 can be moved relative to the cabinet 100 between an open position and a closed position. In certain examples, the door 122 can be pivotally connected to a main body 102 of the cabinet 100 by a hinge. When in the closed position, the front door 122 covers the access opening 164. When in the open position, the front door 122 uncovers the access opening 164 and allows access to the cabinet interior 104.

In certain implementations, a fan system or other ventilation component can be mounted on the front door 122 to provide cooling of the active components within the cabinet 100. In the depicted example, fans 176 are carried by the front door 122. In other examples, the fans 176 or other ventilation components can be mounted at other positions within the cabinet 100. In certain examples, the power supply 134 provides power to the ventilation system for the cabinet 100.

A removable panel 124 provides access to the cabinet interior 104 through the back (e.g., see FIGS. 8-10). In certain examples, the removable panel 124 defines a window that provides visual access to the interior 104 of the cabinet 100.

In certain implementations, one or more racks 114 is mounted within the cabinet 100 to attach various components. For example, the first level 106 of the cabinet 100 can include one or more racks 114 for mounting two splitter module chassis 130 back-to-back. A first of the splitter module chassis 130 (i.e., the front chassis) faces towards the front F of the cabinet 100 and a second of the splitter module chassis 130 (i.e., the back chassis) faces towards the rear R of the cabinet 100. Splitter modules 144 with outputs connected to connectors (e.g., LC connectors) secured in adapters 148 integrated with the modules 144 can be loaded in the chassis 130. The adapters 148 of the modules loaded in the front chassis 130 can be accessed from the front of the cabinet 100 and the adapters 148 of the modules 144 loaded in the back chassis 130 can be accessed from the back of the cabinet 100.

The second level 108 includes one or more racks 114 at which the module mounting chassis 132 can be mounted. In certain implementations, the rack(s) 114 also enable mounting of the shelf 116 on which the power supply 134 seats. The rack(s) 114 also may facilitate mounting of the first ends 142a of the articulated fiber guides 142. Any of a variety of cable management features (e.g., spools, bend radius limiters, guide fingers, etc.) can be disposed on the rack(s) 114 to guide cables within the cabinet 100 to the articulated fiber guides 142.

In certain examples, the cabinet 100 has a relatively small footprint and/or form factor. In one example, the cabinet 100 has a width of 28 inches, a depth of 28 inches and a height of either 45 or 57 inches. In one example, 256 optical connections fit within a cabinet having a volume of about 40,000 square inches or less. In one example, 512 optical connections fit within a cabinet 100 having a volume of 45,000 square inches or less. Other sizes are possible. In one example, the cabinet 100 is the CMS Model 21B1-Ta-A00D00-00 offered by CommScope Inc. of North Carolina.

Certain types of cabinets 100 have more than four levels 106, 108, 110, 112. For example, as shown in FIGS. 12 and 13, certain cabinets 100 have multiple levels at which a component mount 115 can be disposed. In certain examples, each component mount level is bounded by a shelf 116 to which the component mount 115 may be attached. In certain examples, a first OLT 138 is provided at a first component mount 115a at one level of the cabinet 100 and a second OLT 138 is provided at a second component mount 115b at another level of the cabinet 100. In the example shown, the second component mount 115b is disposed beneath the first component mount 115a. In the example shown, a Vhub 136 is mounted to a third component mount 115c that is next to the second component mount 115b. As shown in FIG. 13, mounting multiple OLTs 138 within the cabinet 100 may increase the service capacity of the cabinet 100.

In use, optical fiber from a central office will be routed into the cabinet 100 to provide optical service. Power from a commercial power source also will be routed to the cabinet 100. In certain examples, a fiber optic cable including a plurality of optical fibers can be routed from the cabinet 100 to a splice enclosure. At the splice enclosure, optical fibers routed from the cabinet 100 can be spliced into optical fibers routed to subscriber locations. In one example, the cable routed between the splice enclosure and the cabinet 100 has optical fibers suitable for splicing at one end and includes a plurality of connectorized pigtails at the opposite end. Connectorized ends of the connectorized pigtails can be plugged into the adapter ports 148 located at the first level 106 of the cabinet 100. This way, the outputs from the passive optical splitters 144 can be optically connected to the optical fibers routed to the splice enclosure through the plurality of fiber optic adapters 148. In this way, demateable connections can be made between the outputs of the passive optical splitters 144 and the fibers routed to the splice enclosure.

In certain examples, optical fibers can be configured as patch cords. In one example, the patch cords can include multi-fiber connectors (e.g., MPO connectors) at one end and single-fiber connectors (e.g., SC connectors, LC connectors, etc.) at the opposite end. The multi-fiber connectors can be adapted to interconnect with corresponding adapters 148 provided at the MUX/DE-MUX modules 146 and the passive optical splitters 144. The single-fiber connectors can be incorporated as part of pigtails broken out from the patch cables adjacent the OLT 138 and the Vhub 136 and can be routed into the interior of the OLT 138 and the Vhub 136 and plugged into corresponding ports of the OLT 138 and the Vhub 136.

In one example, a fiber optic cable from a central office is routed into the interior 102 of the cabinet 100 and optical fibers of the fiber optic cable are optically connected to inputs of the MUX/DE-MUX modules 146. The MUX/DE-MUX modules 146 are connected by patch cords to an input side of the OLT 138. A patch cord connects an output side of the OLT 138 to an input side of the Vhub 36. Patch cords connect the output side of the Vhub 136 to input sides of the passive optical splitters 144 at the first level 106. In certain examples, patch cords can also be used to connect certain ones of the MUX/DE-MUX modules 146 directly to the Vhub 136. In this way, certain fibers from the MUX/DE-MUX modules 146 bypass the OLT 138 and go directly to the Vhub 136.

Each of the patch cords connecting the MUX/DE-MUX modules 146 to the OLT 138 and to the Vhub 136 can have single-fiber optical connectors terminated at each end in a pigtail type configuration. The patch cords connecting the OLT 138 to the Vhub 136 can have single-fiber optical connectors incorporated as pigtails that connect to the OLT 138 and can include a multi-fiber connector such as an MPO connector at the opposite end which connects to the Vhub 136. The patch cords connected between the Vhub 136 and the splitter can include MPO's at the ends which connect to the Vhub 136. The patch cords that connect the MUX/DE-MUX modules 146 to the OLT 138 and/or the Vhub 136 can be protected by the flexible fiber management structure 142 routed between the second level 108 of the cabinet 100 and the third level 110 of the cabinet 100. Similarly, the patch cords that connect the Vhub 136 to the splitter 144 can also be routed through the same flexible fiber management structures 142 that are connected between the first and third levels 106, 110 of the cabinet 100.

FIGS. 14-15 depict an alternative cabinet 200 that includes a separate side enclosure or chamber 300 mounted thereto is depicted in accordance with the principles of the present disclosure. To the extent that the cabinet 200 is similar to the cabinet 100, the description will not be repeated and will instead be directed to the primary differences. Specifically, the cabinet 200 differs from the cabinet 100 in how the active and passive components are housed.

The vertical space of the cabinet 200 can be divided into three levels including a first level 206, a second level 208, and a third level 210. The first level 206 is at the top of the cabinet 200, the second level 208 is directly below the first level 206 and the third level 210 is positioned directly below the second level 208. It will be appreciated that the cabinet 200 may have more than three levels 206, 208, 210. In certain examples, the cabinet 200 may have four levels similar to the cabinet 100, although alternatives are possible.

The cabinet 200 can include active components, such as the Vhub 136 and/or and the OLT 138 while passive optical components, such as passive optical splitter modules 144 and/or one or more multiplexing/demultiplexing modules 146 are housed in the side chamber 300. Because the passive optical splitter modules 144 and the multiplexing/demultiplexing modules 146 are positioned in the side chamber 300, more space can be provided in an interior 204 of the cabinet 200 for additional active components. That is, the cabinet 200 can be filled with multiple VHubs 136 and OLTs 138 to increase the service capacity of the cabinet 200. In one example, the power supply 134 and Vhub 136 can be mounted at the first level 206 of the cabinet 200, although alternatives are possible. The second level 208 of the cabinet 200 can include Vhubs 136 and/or OLTs 138. The third level 210 of the cabinet 200 can include a plurality of batteries 140 that are electrically connected to the power supply 134 positioned at the first level 206. The Vhubs 136, OLTs 138, and power supply 134 can each be accessible from the front F of the cabinet 200. Compared to the cabinet 100, the cabinet 200 does not include the passive optical splitter modules 144 and/or one or more multiplexing/demultiplexing modules 146.

Turning to FIGS. 16-18, the cabinet 200 may include multiple component mounts 215 disposed in the interior thereof for mounting various types of communications components. As shown, the first and second levels 206, 208 each provide a region for two component mounts 115 including the linear slide mechanism 118 that can be used to mount separate components within the cabinet 200. That is, the linear slide mechanism 118 of the component mount 115 allows the OLT 138 and the Vhub 136, or other mounted component to be independently slid from within an interior 204 of the cabinet 200 out a front opening 264 of the cabinet 200 for ready access. The linear slide mechanism 118 allows the OLT 138 and the Vhub 136 to be slid linearly relative to the cabinet 200 from a retracted position (see FIG. 14) to an extracted position (see FIG. 17). The linear slide mechanism 118 includes one or more linear slides 166, such as drawer slides, for allowing linear motion.

In the example shown, a first OLT 138a can be mounted to a linear slide mechanism 118a of a first component mount 115a at the first level 206 of the cabinet 200. In certain examples, a linear slide mechanism 118b of a second component mount 115b may mounted next to the first component mount 115a at the first level 206 of the cabinet 200. The first and second linear slide mechanisms 118a, 118b are installed side-by-side within the cabinet 200 at the first level 206.

The linear slide mechanism 118b of the second component mount 115b can be attached to a slidable shelf 216 positioned in the first level 206 of the cabinet 200, although alternatives are possible. The power supply 134 can be seated on a slidable shelf 216 such that the power supply 134 can slide relative to the cabinet 200 via the linear slide mechanism 118b to a fully extracted position and be accessible from the front F of the cabinet 200. The power supply 134 can be positioned next to the first component mount 115a at the first level 206 of the cabinet 200.

In certain examples, the slidable shelf 216 can be coupled to the linear slides 166 via first and second plates 220a, 220b. The first and second plates 220a, 220b can extend upwardly from the slidable shelf 216. For example, the first and second plates 220a 220b may extend perpendicularly relative to the slidable shelf 216 at respective minor sides 222a, 222b of the slidable shelf 216. The first and second plates 220a, 220b may each have a length L that extends between a proximal end 224 and a distal end 226 where the distal end 226 extends beyond a height H of the power supply 134 seated on the slidable shelf 216.

The first and second plates 220a, 220b may include mounting tabs 222 on opposite sides 228, 230 of the first and second plates 220a, 220b at the distal ends 226 of the first and second plates 220a, 220b. The mounting tabs 222 can extend in a direction that is perpendicular to the first and second plates 220a, 220b. The mounting tabs 222 can extend in a horizontal direction to be aligned with the linear slides 166 to be attached thereto. The mounting tabs 222 can define openings for receiving fasteners that attach the mounting tabs 222 to the linear slides 166 to allow the slidable shelf 216 to be moved relative to the cabinet 200. In the example shown, the linear slides 166 include slide members that can telescopically slide relative to one another to move the slidable shelf 216 in and out of the interior 204 of the cabinet 200 between retracted and extracted positions. In certain examples, the mounting tabs 222 of the respective first and second plates 220*a*, 220*b* can be secured to the linear slide mechanism 118 at opposite first and second ends 232, 234 of the linear slides 166. The slides 166 allow the slidable shelf 216 to be slid fully out the front opening 264 from the interior 204 of the cabinet 200 for ready access, and also allow the slidable shelf 216 to be slid fully inside the cabinet 200.

As depicted, a second OLT 138*b* can be mounted to a linear slide mechanism 118*c* of a third component mount 115*c* at the second level 208 of the cabinet 200 and a Vhub 136 can be mounted to a linear slide mechanism 118*d* of a fourth component mount 115*d* next to the third component mount 115*c* in the second level 208 of the cabinet 200. As such, the third and fourth linear slide mechanisms 118*c*, 118*d* are installed side-by-side within the cabinet 200 at the second level 208. It will be appreciated that the third and fourth component mounts 115*c*, 115*d* can be arranged to mount either one of a Vhub 136 or OLT 138 as previously described above with reference to FIG. 12.

The cabinet 200 may also include one or more flexible fiber routing devices 142 (see FIG. 22) similar to the cabinet 100 that may provide bend radius protection. The flexible fiber routing devices 142 can be routed between the first, second, and third levels 206, 208, 210 to protect the optical fibers. For example, at least a first flexible fiber routing device 142 can be routed between the first level 206 and the third level 210 and at least a second flexible fiber routing device 142 can be routed between the second level 208 and the third level 210. In certain examples, the side chamber 300 may also include members for routing and management of patch cords, optical fibers, etc.

Referring to FIGS. 19-24, the side chamber 300 can be mounted to one of first and second side walls 236, 238 of the cabinet 200 that is not on either a front F or rear R of the cabinet 200. For example, the first and second side walls 236, 238 can each have an interior side and an exterior side in which the side chamber 300 can be mounted to the exterior side of the side walls 236, 238. As depicted in FIG. 24, the side chamber 300 is attached to the exterior side of the first side wall 236 of the cabinet 200. In certain examples, the side chamber 300 and the cabinet 200 can be mounted together to share a common wall at the first side wall 236 of the cabinet 200. In other examples, the side chamber 300 may be separately mounted and detached from the cabinet 200. The side chamber 300 can include a right-side wall 306, a left-side wall 308, a top wall 310, a base 312 and a back wall 314 that together define a cabinet interior space 304. The back wall 314 is essentially the first side wall 236 of the cabinet 200 such that the cabinet 200 and side chamber 300 share a common wall. It will be appreciated that the back wall 314 of the side chamber 300 may be a separate wall from the first side wall 236 of the cabinet 200.

The side chamber 300 can be similar in size to the cabinet 200, although alternatives are possible. In certain examples, the side chamber 300 can have a smaller footprint or volume compared to the cabinet 200. That is, the overall width, depth, and height of the side chamber 300 can be smaller than the cabinet 200. In other examples, the side chamber 300 may have the same footprint or volume compared to the cabinet 200. In other examples, the side chamber 300 can be sized half as a height that is The side chamber 300 can have a configuration that provides access to the cabinet interior space 304 of the side chamber 300 from the front F. For example, the side chamber 300 can include a door 322 that can be moved relative to the side chamber 300 between an open position and a closed position. In certain examples, the door 322 can be pivotally connected to a main body 302 of the side chamber 300 by a hinge 340. When in the closed position, the door 322 covers an access opening 364. When in the open position, the door 322 uncovers the access opening 364 to access the splitters 144 and multiplexers 146. The back wall 314 of the side chamber 300 defines a plurality of module mounting holes 316 for mounting multiple passive optical components via manually actuatable fasteners as desired within the side camber 300. The resultant improvement provides additional space for customizing passive optical components that connect with the active components in the cabinet 200.

The interior 304 of the side chamber 300 can house one or more passive optical splitter modules 144 and one or more multiplexing/demultiplexing modules 146 (MUX/DE-MUX). These modules may be mounted to a rack 301 within the side chamber 300. The rack 301 can include a plurality of mounting locations 316 generally located along a pair of vertical supports 303, 305, located on either side of the rack 301. The vertical supports 303, 305 can be joined and spaced apart by a top and bottom 307, 309. The passive optical splitter modules 144 and multiplexing/demultiplexing modules 146 can be mounted within chassis 313 (see FIG. 21) provided at any one of the plurality of mounting locations 316 to allow for various mounting configurations. The rack 301 can also include one or more patch panel of adapters 311 that can be mounted between the vertical supports 303, 305 and face toward the access opening 364 of the side chamber 300. This greatly increases the versatility of the side chamber 300 and allows for a high density of the passive optical components to be placed in the side chamber 300, reducing or eliminating the number of passive optical components needed in the cabinet 200.

The access opening 364 of the side chamber 300 allows access to the passive optical splitter modules 144 and the multiplexing/demultiplexing modules 146 positioned in the interior 304 of the side chamber 300. The optical fibers within the interior 204 of the cabinet 200 can be routed to inputs of the MUX/DE-MUX modules 146 in the side chamber 300. Along a side of the passive optical splitter modules 144 and the multiplexing/demultiplexing modules 146 are vertical cable guides 317. Each cable guide 317 is aligned immediately adjacent the respective passive optical splitter modules 144 and/or multiplexing/demultiplexing modules 146. Patching cables can be routed laterally in separate layers through side cable guide openings 321 (see FIG. 18) defined in a vertical cable channel 319. The patch cables can also be routed between and over the cable guides 317. Once the optical fibers are routed horizontally through the cable guide side openings 321, the optical fibers can then be routed into the cabinet 200 through one or more openings 234 (see FIG. 23) defined in the first side 230 of the cabinet 200. In certain examples, the one or more openings 234 may be defined in the base 312 of the side chamber 300.

Signals (e.g., optical signals and/or electrical signals) from the service provider can be routed into the side chamber 300 and directed to the MUX/DE-MUX modules 146 (e.g., wave division multiplexers). Signals from at least a first of the MUX/DE-MUX modules 146*a* can be routed directly to the Vhub 136 in the cabinet 200. Signals from at least a second of the MUX/DE-MUX modules 146*b* in the side chamber 300 can be routed first to a first OLT 138a and then to the Vhub 136 in the cabinet 200. In certain examples, the MUX/DE-MUX modules 146 can be connected by patch cords that can be routed through the one or more openings 234 to an input side of the OLT 138. For example, a patch cord (not shown) can connect an output side of the OLT 138a to an input side of the Vhub 136. In certain examples, the one or more openings 234 allow patch cords to be routed therethrough to connect certain ones of the MUX/DE-MUX modules 146 directly to the Vhub 136. In this way, certain fibers from the MUX/DE-MUX modules 146 bypass the OLT 138 and go directly to the Vhub 136.

The Vhub 136 outputs optical signals to at least a first of the splitter modules 144a or other optical components in the side chamber 300. In certain examples, patch cords can be routed through the one or more openings 234 to connect the output side of the Vhub 136 to input sides of the passive optical splitters 144 at the side chamber 300. Optical signals are power split at the splitter modules 144 and can subsequently be directed towards subscribers via cables plugged into the splitter outputs. The splitter modules 144 and the MUX/DE-MUX modules 146 can be accessible through the access opening 364 of the side chamber 300.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A telecommunications device comprising:
a cabinet having an access opening through which an interior of the cabinet can be accessed; and
a component mount installed within the cabinet, the component mount including a component mounting rod to which a strand mount clamp can be secured to hang a telecommunications component beneath the component mounting rod, the component mounting rod being supported by a linear slide mechanism movable between an extended position and a retracted position, the component mounting rod being carried by the linear slide mechanism as the linear slide mechanism is moved between the extended and retracted positions, the component mounting rod being fully within the interior of the cabinet when the linear slide mechanism is in the retracted position, and at least a portion of the component mounting rod being positioned outside the cabinet when the linear slide mechanism is in the extended position.

2. The telecommunications device of claim 1, wherein the component mounting rod is fully outside the cabinet when the linear slide mechanism is in the extended position.

3. The telecommunications device of claim 1, wherein the linear slide mechanism is rated to support at least 45 kilograms.

4. The telecommunications device of claim 1, wherein the cabinet includes a hinged front door for covering the access opening.

5. The telecommunications device of claim 4, wherein the linear slide mechanism moves along a front-to-rear orientation when moving between the extended and retracted positions, and wherein the component mounting rod extends horizontally in the front-to-rear orientation.

6. The telecommunications device of claim 1, further comprising an articulated fiber guide having a first end fixed relative to the cabinet, and a second end that moves with the linear slide mechanism relative to the cabinet as the linear slide mechanism moves between the extended and retracted positions.

7. The telecommunications device of claim 1, wherein the component mount is a first component mount, the component mounting rod is a first component mounting rod and the linear slide mechanism is a first linear slide mechanism, wherein the telecommunications device includes a second component mount including a second component mounting rod supported by a second linear slide mechanism, wherein the first and second component mounts are installed side-by-side within the cabinet, wherein the first and second component mounting rods are parallel, and wherein the first and second linear slide mechanisms both linear slide along a same orientation when moving between the extended and retracted positions.

8. The telecommunications device of claim 7, wherein the first and second linear slide mechanisms are independently movable between the extended and retracted positions.

9. The telecommunications device of claim 8, further comprising a first articulated fiber guide having a first end fixed relative to the cabinet and a second end that moves with the first linear slide mechanism relative to the cabinet as the first linear slide mechanism moves between the extended and retracted positions, wherein the telecommunications device also includes a second articulated fiber guide having a first end fixed relative to the cabinet and a second end that moves with the second linear slide mechanism relative to the cabinet as the second linear slide mechanism moves between the extended and retracted positions.

10. The telecommunications device of claim 9, further comprising a fiber optic patch cord routed through the first and second articulated fiber guides prior to any components being mounted at the first and second component mounts, the fiber optic patch cord having a first connectorized end at the first component mount and a second connectorized end at the second component mount.

11. A telecommunications device comprising:
a cabinet having a front access opening that can be opened and closed by a hinged front door;
a shelf secured within the cabinet;
a pair of linear slides mounted to a bottom side of the shelf;
a horizontal panel coupled to the linear slides such that the linear slides allow the horizontal panel to be moved relative to the shelf between a first position in which the horizontal panel is fully within an interior of the cabinet and positioned beneath the shelf and a second position in which the linear slides extend forwardly through the front access opening and at least a majority of the horizontal panel is located outside the cabinet; and
a horizontal component mounting rod secured to the horizontal panel to which a strand mount clamp can be secured to hang a telecommunications component beneath the horizontal component mounting rod.

12. The telecommunications device of claim 11, wherein the horizontal component mounting rod is secured to the horizontal panel by front and rear tabs that project downwardly from the horizontal panel.

13. The telecommunications device of claim 11, wherein the cabinet defines a splitter mounting region for mounting passive optical splitter modules each including splitter outputs located at a plurality of fiber optic adapters carried by the passive optical splitter modules.

14. The telecommunications device of claim 13, wherein the passive optical splitter modules are accessible through the front access opening and are secured within a front splitter chassis attached to a front rack located within the cabinet.

15. The telecommunications device of claim 14, further comprising a rear splitter chassis attached to a rear rack located within the rear splitter chassis, wherein passive optical splitter modules secured to the rear splitter chassis are accessible from a rear of the cabinet through a rear access opening.

16. The telecommunications device of claim 15, wherein a power source is supported on the shelf and back-up batteries for the power source are located at a bottom region of the cabinet.

17. The telecommunication device of claim 16, further comprising a WDM chassis mounted to a rear rack at a same level as the power source, wherein WDM modules secured to the WDM chassis are accessible through the rear access opening.

18. The telecommunications device of claim 11, wherein an OLT or a V-hub is hung beneath the horizontal component mounting rod via a strand clamp attached to the horizontal component mounting rod.

19. The telecommunications device of claim 11, further comprising an articulated fiber guide having a first end fixed relative to the cabinet, and a second end that moves with the horizontal panel relative to the cabinet as the horizontal panel is moved between the first and second positions.

20. The telecommunications device of claim 11, further comprising a chamber mounted to a side wall of the cabinet, the chamber including a fiber optic equipment rail configured to mount passive optical components.

21. The telecommunications device of claim 20, wherein the chamber includes a front access opening that is opened and closed by a hinged front door, and wherein the passive optical components are accessible through the front access opening of the chamber.

22. The telecommunications device of claim 20, wherein the passive optical components are splitter modules and/or multiplexing/demultiplexing modules, and wherein the chamber defines cable guide openings for routing patch cables from the chamber into the cabinet.

* * * * *